(12) United States Patent
Huang et al.

(10) Patent No.: US 12,115,738 B2
(45) Date of Patent: Oct. 15, 2024

(54) ASSEMBLIES AND METHODS FOR FORMING FIBER-REINFORCED THERMOPLASTIC STRUCTURES WITH LIGHTNING STRIKE PROTECTION

(71) Applicant: ROHR, INC., Chula Vista, CA (US)

(72) Inventors: Jonathan S. Huang, Pasadena, CA (US); Jeffrey D. Woods, Beaumont, CA (US); Michael van Tooren, San Diego, CA (US); Noushin Bahramshahi, Mission Viejo, CA (US)

(73) Assignee: ROHR, INC., Chula Vista, CA (US)

( * ) Notice: Subject to any disclaimer, the term of this patent is extended or adjusted under 35 U.S.C. 154(b) by 28 days.

(21) Appl. No.: 17/577,923

(22) Filed: Jan. 18, 2022

(65) Prior Publication Data
US 2023/0226779 A1    Jul. 20, 2023

(51) Int. Cl.
| | | |
|---|---|---|
| *B32B 41/00* | (2006.01) | |
| *B29C 70/34* | (2006.01) | |
| *B29C 70/54* | (2006.01) | |
| *B29C 70/68* | (2006.01) | |
| *B29K 101/12* | (2006.01) | |
| *B29K 705/00* | (2006.01) | |

(52) U.S. Cl.
CPC ............ *B29C 70/342* (2013.01); *B29C 70/54* (2013.01); *B29C 70/688* (2013.01); *B29K 2101/12* (2013.01); *B29K 2705/00* (2013.01)

(58) Field of Classification Search
CPC ..... B29C 70/342; B29C 70/54; B29C 70/688; B29K 2010/12; B29K 2705/00
USPC .................... 156/60, 64, 350, 351, 378, 379
See application file for complete search history.

(56) References Cited

U.S. PATENT DOCUMENTS

| | | | |
|---|---|---|---|
| 4,194,938 A | | 3/1980 | Figge et al. |
| 4,957,802 A | * | 9/1990 | Mentzer .............. B29C 37/0025 428/215 |
| 10,717,212 B2 | | 7/2020 | Parkinson et al. |
| 11,027,856 B2 | | 6/2021 | Sang et al. |
| 2011/0005666 A1 | | 1/2011 | Burchell |
| 2012/0145319 A1 | * | 6/2012 | Schaaf ...................... B64F 5/10 156/324 |
| 2014/0110633 A1 | | 4/2014 | Pratte et al. |

(Continued)

FOREIGN PATENT DOCUMENTS

| | | |
|---|---|---|
| DE | 102009017112 | 10/2010 |
| DE | 102011056637 | 6/2013 |

(Continued)

OTHER PUBLICATIONS

USPTO; Requirement for Restriction dated Mar. 31, 2023 in U.S. Appl. No. 17/577,971.

(Continued)

*Primary Examiner* — Michael N Orlando
*Assistant Examiner* — Joshel Rivera
(74) *Attorney, Agent, or Firm* — SNELL & WILMER L.L.P.

(57) ABSTRACT

A method for forming a fiber-reinforced thermoplastic part may comprise the steps of locating a lightning strike protection layer on a mold surface of a mold tool, locating a thermoplastic layer over the mold tool, heating the thermoplastic layer to a pliable forming temperature, conforming the thermoplastic layer to a mold surface of the mold tool, and depositing a plurality of fiber strips over the thermoplastic layer.

16 Claims, 22 Drawing Sheets

(56) References Cited

U.S. PATENT DOCUMENTS

2019/0152168 A1 5/2019 Tobin et al.
2021/0331432 A1* 10/2021 Tobin .................... B29C 70/386
2021/0394467 A1* 12/2021 Wadsworth ............. B29C 70/02
2023/0226780 A1 7/2023 Huang et al.

FOREIGN PATENT DOCUMENTS

| EP | 3575066 | 12/2019 |
| WO | 2010010084 | 1/2010 |
| WO | 2010135318 | 11/2010 |
| WO | 2021079116 | 4/2021 |
| WO | 2021262927 | 4/2021 |

OTHER PUBLICATIONS

European Patent Office, European Search Report dated Jun. 16, 2023 in Application No. 23151840.8.
European Patent Office, European Search Report dated Jun. 15, 2023 in Application No. 23152195.6.
USPTO; Non-Final Office Action dated Aug. 29, 2023 in U.S. Appl. No. 17/577,971.
USPTO; Final Office Action dated Dec. 20, 2023 in U.S. Appl. No. 17/577,971.
USPTO; Advisory Action dated Mar. 11, 2024 in U.S. Appl. No. 17/577,971.
USPTO; Notice of Allowance dated Mar. 10, 2024 in U.S. Appl. No. 17/577,971.

* cited by examiner

ASSEMBLIES AND METHODS FOR FORMING FIBER-REINFORCED THERMOPLASTIC STRUCTURES WITH LIGHTNING STRIKE PROTECTION

FIELD

The present disclosure relates generally to thermoplastics manufacturing, and more specifically to assemblies and methods for forming fiber-reinforced thermoplastic structures.

BACKGROUND

Various industries include components having multi-dimensional charges for various uses. In particular, the aerospace industry utilizes nacelles for providing a protective housing around gas turbine engine components as well as for providing an aerodynamic surface for reducing drag, among other applications. Various nacelle structures (e.g., inlet, fan cowls, skins, etc.) may be made from fiber-reinforced materials. Fiber-reinforced structures are typically formed using automated fiber placement systems, wherein fiber-reinforced strips, "slit tape" or "tows," are applied over the surface of a mold tool. Prior to applying the first layer of tows, a patch work of polyimide film is manually taped to the surface of the mold tool so that the initial layer of tows will stay in place on the mold surface. This mold preparation can be cumbersome, error prone, and costly.

SUMMARY

A method for forming a fiber-reinforced thermoplastic part is disclosed herein. In accordance with various embodiments, the method may comprise the steps of locating a lightning strike protection layer on a mold surface of a mold tool, locating a thermoplastic layer over the mold tool, heating the thermoplastic layer to a pliable forming temperature, conforming the thermoplastic layer to the mold surface of the mold tool, and depositing a plurality of fiber strips over the thermoplastic layer.

In various embodiments, conforming the thermoplastic layer to the mold surface of the mold tool comprises forming an airtight seal between the thermoplastic layer and the mold tool and evacuating air from between the thermoplastic layer and the mold surface of the mold tool.

In various embodiments, the lightning strike protection layer is a metallic mesh. In various embodiments, heating the thermoplastic layer to the pliable forming temperature comprises heating the thermoplastic layer with the thermoplastic layer spaced apart from the mold surface and the lightning strike protection layer.

In various embodiments, depositing the plurality of fiber strips over the thermoplastic layer includes depositing a first layer of fiber strips on the thermoplastic layer and depositing a second layer of fiber strips on the first layer of fiber strips. In various embodiments, the pliable forming temperature is greater than or equal to a glass transition temperature of the thermoplastic layer and less than a melting point of the thermoplastic layer.

In various embodiments, locating the thermoplastic layer over the mold tool may comprise disposing an exterior surface of the thermoplastic layer in a concave configuration. The exterior surface may face a plurality of heater units. Heating the thermoplastic layer to the pliable forming temperature may comprise disposing each heater unit of the plurality of heater units in at least substantially equally-spaced relation to the exterior surface.

In various embodiments, evacuating air from between the thermoplastic layer and the mold surface of the mold tool comprises powering on a vacuum fluidly coupled to a channel defined by the mold tool. In various embodiments, the method may further comprise releasing the thermoplastic layer from the mold tool by turning off the vacuum.

An assembly for forming a fiber-reinforced thermoplastic part is also disclosed herein. In accordance with various embodiments, the assembly may comprise a mold tool having a mold surface and a plurality of attachment frames located around a perimeter of the mold surface. Plurality of attachment frames is configured to couple a thermoplastic layer to the mold tool such that the thermoplastic layer is spaced apart from the mold surface. The attachment frames are raised with respect to the mold surface. The assembly further includes a vacuum configured to evacuate air from over the mold surface and a fiber dispensing assembly configured to deposit a plurality of fiber strips over the mold surface.

In various embodiments, a heating element may be configured to heat a thermoplastic layer to a pliable forming temperature. In various embodiments the heating element comprises a plurality of heater units. In various embodiments, each heater unit of the plurality of heater units is at least substantially-equally spaced from the mold surface.

In accordance with various embodiments, a method for forming a fiber-reinforced thermoplastic part may comprise the steps of locating a lightning strike protection layer between a first thermoplastic layer and a second thermoplastic layer and coupling the lightning strike protection layer, the first thermoplastic layer, and the second thermoplastic layer to a mold tool with the lightning strike protection layer, the first thermoplastic layer, and the second thermoplastic layer spaced apart from a mold surface of the mold tool. The method further includes the steps of heating the first thermoplastic layer and the second thermoplastic layer to a pliable forming temperature, conforming the first thermoplastic layer, the lightning strike protection layer, and the second thermoplastic layer to the mold surface, and depositing a plurality of fiber strips over the second thermoplastic layer.

In various embodiments, conforming the first thermoplastic layer, the lightning strike protection layer, and the second thermoplastic layer to the mold surface comprises forming an airtight seal around a perimeter of the first thermoplastic layer, the lightning strike protection layer, and the second thermoplastic layer and evacuating air from between the first thermoplastic layer and the mold surface of the mold tool.

In various embodiments, forming the airtight seal around the perimeter of the first thermoplastic layer, the lightning strike protection layer, and the second thermoplastic layer comprises attaching a tape to the first thermoplastic layer and to a plurality of attachment frames located around a perimeter of the mold surface.

In various embodiments, forming the airtight seal around the perimeter of the first thermoplastic layer, the lightning strike protection layer, and the second thermoplastic layer comprises locating a top frame on an exterior surface of the second thermoplastic layer.

In various embodiments, depositing the plurality of fiber strips over the second thermoplastic layer comprises depositing a first layer of fiber strips on the second thermoplastic layer, consolidating a first fiber strip of the first layer of fiber strips with the second thermoplastic layer and the first thermoplastic layer by heating the first fiber strip, the first thermoplastic layer, and the second thermoplastic layer to a temperature sufficient to melt the first thermoplastic layer, the second thermoplastic layer, and a matrix material of the first fiber strip, and depositing a second layer of fiber strips on the first layer of fiber strips. Consolidating the first fiber strip with the second thermoplastic layer and the first thermoplastic layer may comprise crosslinking the first thermoplastic layer with the second thermoplastic layer through openings in the lightning strike protection layer.

In various embodiments, the method may further comprise the step of consolidating the plurality of fiber strips, the second thermoplastic layer, and the first thermoplastic layer by locating a vacuum bag over the plurality of fiber strips and the mold tool, placing the mold tool in an oven, and applying heat and pressure to the plurality of fiber strips, the second thermoplastic layer, and the first thermoplastic layer. The heat and pressure are sufficient to melt the second thermoplastic layer, the first thermoplastic layer, and a matrix of the plurality of fiber strips.

In various embodiments, the method further comprise releasing the first thermoplastic layer, the lightning strike protection layer, the second thermoplastic layer, and the plurality of fiber strips from the mold tool by turning off a vacuum fluidly coupled to a channel extending to the mold surface.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The assemblies and methods, as described herein, may be used to form fiber-reinforced thermoplastic structures having a lightning strike protection layer. The assemblies and methods, described herein, provide relatively quick manufacturing, e.g., as compared to conventional automated fiber placement systems wherein an initial layer of polyimide tape strips are applied to the mold surface. The assemblies and methods, described herein, may provide a manufacturing process for forming a relatively complex geometry, while minimizing, or eliminating, wrinkling.

Figure 1:
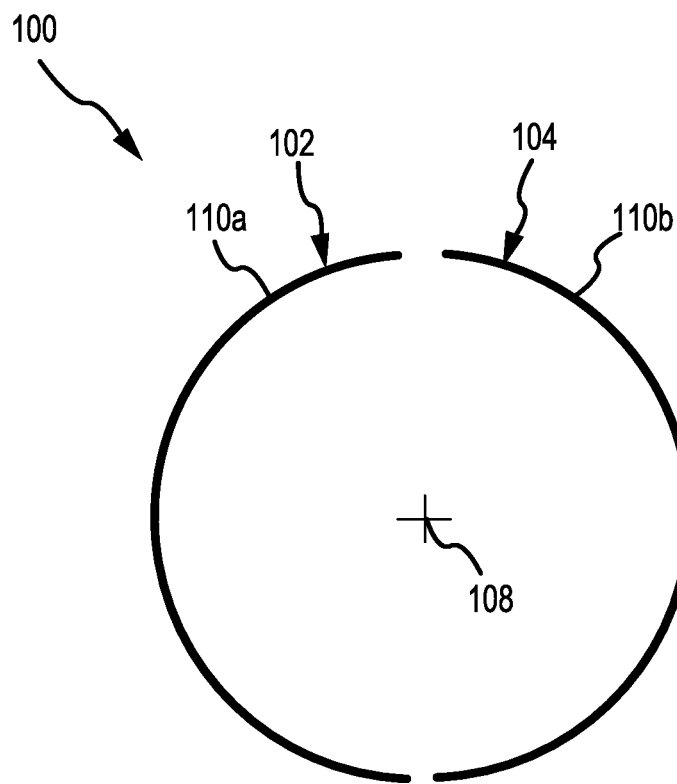
FIG. 1 illustrates a front-view profile of a fan cowl, in accordance with various embodiments.

With reference to FIG. 1, a fan cowl 100 is illustrated, in accordance with various embodiments. Fan cowl 100 may include a first fan cowl half 102 and a second fan cowl half 104. First fan cowl half 102 may include a first outer skin 110a. Second fan cowl half 104 may include a second outer skin 110b. First outer skin 110a and second outer skin 110b may each comprise a semi-cylindrical geometry when viewed from the aft direction, as shown in the illustrated embodiment. First and second outer skins 110a, 110b may define a centerline axis 108. Stated differently, first and second outer skins 110a, 110b may be bent around/disposed about centerline axis 108.

First and second outer skins 110a, 110b may be made from a fiber-reinforced thermoplastic. In various embodiments, first and second outer skins 110a, 110b may formed from a carbon fiber, glass fiber, aramid fiber, or any other suitable fiber in a thermoplastic matrix. Various thermoplastics may be used for forming a fiber-reinforced thermoplastic component, as described herein, including amorphous thermoplastics (e.g., polyetherimide (PEI), polycarbonate (PC), polysulfone (PSU), polyethersulfone (PES)), semi crystalline thermoplastics (e.g., polyvinylidene fluoride (PVDF), polytetrafluoroethylene (PTFE), polyphenylene sulfide (PPS), polyetheretherketone (PEEK), polyetherketoneketone (PEKK), polyaryletherketone (PAEK)), or any other suitable thermoplastic.

In accordance with various embodiments, first and second outer skins 110a, 110b may be manufactured using an automated fiber placement (AFP) assembly, as described herein. Because first and second outer skins 110a, 110b serve as an aerodynamic surface in fan cowl applications, it may be desirable for first and second outer skins 110a, 110b to be formed having a smooth outer surface and to minimize wrinkling during the forming process. In this regard, first and second outer skins 110a, 110b may be manufactured using the assemblies and methods, as described herein. While the disclosed methods and assemblies may find particular use in connection with fan cowl skins, various aspects of the disclosed embodiments may be adapted for manufacturing a variety of fiber-reinforced thermoplastic structures. For example, the disclosed methods and assemblies may be used to form other nacelle structures (e.g., inlets, lip skins, thrust reverser components, etc.) and/or any structure that is formed by AFP over a mold surface. As such, numerous applications of the present disclosure may be realized.

Figure 2:
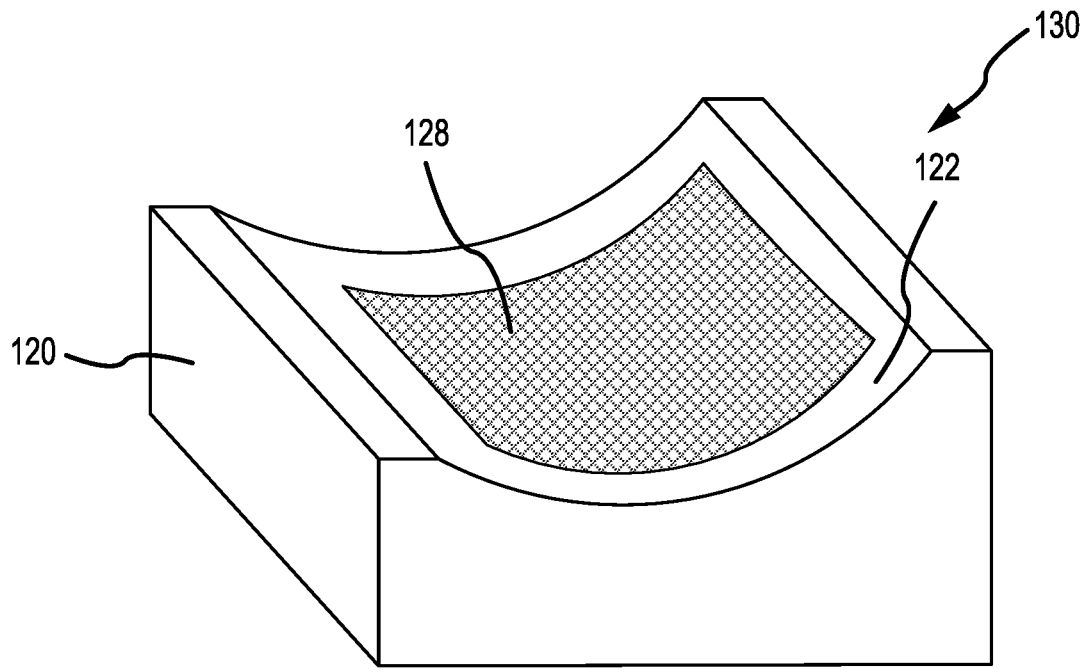
FIG. 2 illustrates a mold tool of an AFP assembly, in accordance with various embodiments.

With reference to FIG. 2, a mold tool 120 of an AFP assembly 130 is illustrated, in accordance with various embodiments. Mold tool 120 is configured to receive and support deposition of fiber strips during an AFP operation. Mold tool 120 may be formed of metal, metal alloy, and/or any material capable of withstanding the temperatures and pressures applied during the AFP operation. Mold tool 120 includes a mold surface 122. Mold surface 122 may include various contouring and/or curvatures and/or complex geometries (e.g. protrusions, surface angles, etc.). The shape of mold surface 122 is configured to produce the desired component surface shape. In this regard, after completion of the AFP operation, the finished component retains and complements the shape of mold surface 122. In various embodiments, mold surface 122 has a contour matching, or complementing, the desired geometry of first and second outer skins 110a, 110b, with momentary reference to FIG. 1.

A lightning strike protection layer 128 may be located on mold surface 122 of mold tool 120. The lightning strike protection layer 128 be a metallic mesh. For example, lightning strike protection layer 128 may be wire mesh having wires of copper, aluminum, titanium, or any other metal or metal alloy. A height (or wire dimeter) of lightning strike protection layer 128 is such that lightning strike protection layer 128 displays flexibility relative to the plane formed by the length and width dimensions of lightning strike protection layer 128.

Figure 3A:
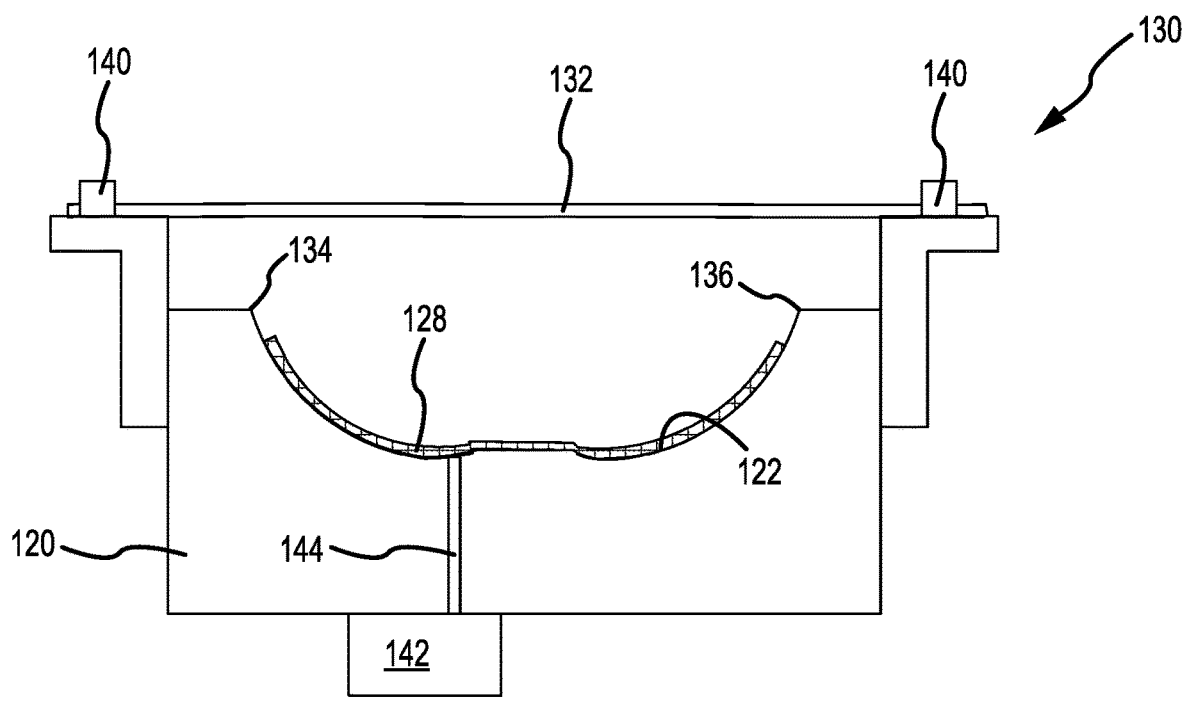
FIGS. 3A, 3B, 3C, and 3D illustrate deposition of a lightning strike protection layer and a thermoplastic layer over a mold tool of an AFP assembly, in accordance with various embodiments.
Figure 5:
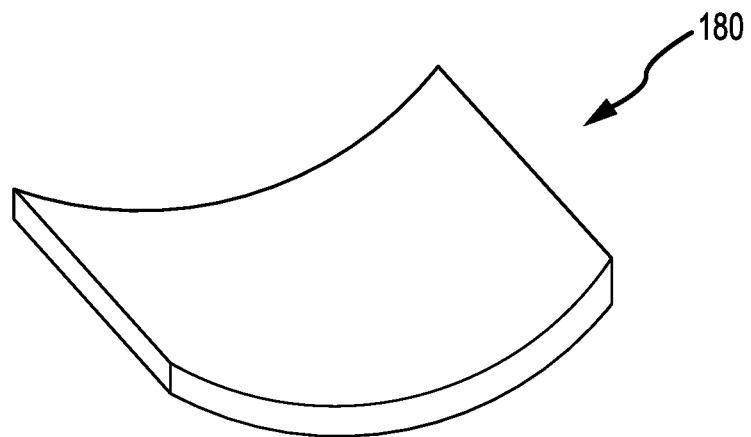
FIG. 5 illustrates a fiber-reinforced thermoplastic part, in accordance with various embodiments.

With reference to FIG. 3A, in accordance with various embodiments, AFP assembly 130 is configured to deposit a thermoplastic layer 132 over mold surface 122 and lightning strike protection layer 128. Thermoplastic layer 132 may be formed of thermoplastic polymer, PEI, PC, PSU, PES, PVDF, PTFE, PPS, PEEK, PEKK, PAEK, or any other suitable thermoplastic. In accordance with various embodiments, thermoplastic layer 132 is in the form of a sheet configured to cover mold surface 122. In this regard, thermoplastic layer 132 may be a single, unibody member that extends continuously from a first edge 134 of mold surface 122 to a second, opposing edge 136 of mold surface 122. In accordance with various embodiments, a length and a width of thermoplastic layer 132 are equal to or greater than the length and the width, respectively, of the final fiber-reinforced thermoplastic part 180 (FIG. 5). Thermoplastic layer 132 may be formed solely of thermoplastic. In this regard, thermoplastic layer 132 may be devoid of fibers.

In accordance with various embodiments, thermoplastic layer 132 may be coupled to the mold tool 120. For example, in various embodiments, a sealing member 140 of AFP assembly 130 may be located around the perimeter of thermoplastic layer 132 and may form an airtight seal between thermoplastic layer 132 and mold tool 120. Sealing member 140 may comprise a tape, clamp, frame, clip, or any other structure capable of forming an airtight seal around thermoplastic layer 132. A vacuum 142 (e.g., a vacuum pump or vacuum generator) may be coupled to mold tool 120. Vacuum 142 may be configured to evacuate the air from between mold surface 122 and thermoplastic layer 132. For example, in various embodiments, mold tool 120 defines a channel 144 extending to mold surface 122. Vacuum 142 may be fluidly coupled to channel 144, such that vacuum 142 evacuates the air from between thermoplastic layer 132 and mold surface 122 of mold tool 120 via channel 144.

Figure 3B:
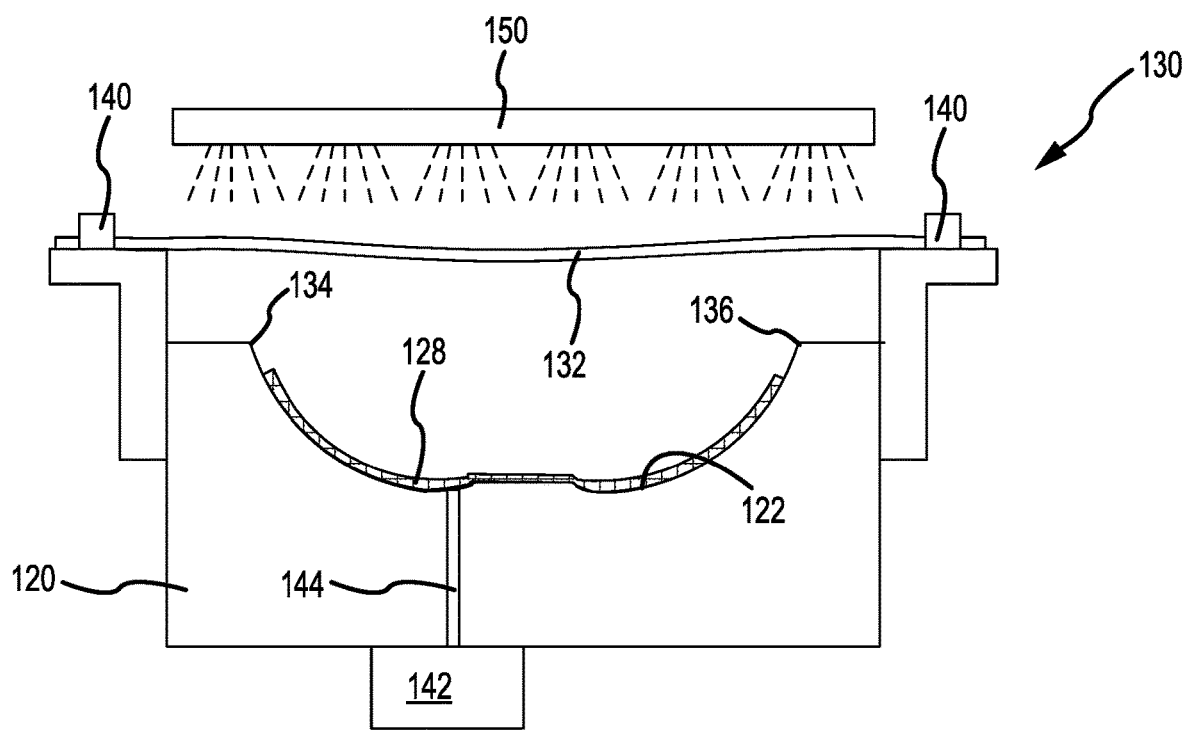

With reference to FIG. 3B, in accordance with various embodiments, a heating element 150 of AFP assembly 130 is configured to heat thermoplastic layer 132 to a sufficient pliable forming temperature, wherein the thermoplastic layer 132 becomes pliable for forming purposes. Prior to heating, thermoplastic layer 132 may be rigid or generally non-pliable. In accordance with various embodiments, a pliable forming temperature for a thermoplastic material may be between 190° and 750° Fahrenheit (F) (87.8°-398.9° Celsius (C)). In various embodiments, the pliable forming temperature for the thermoplastic layer 132 is greater than or equal to a glass transition temperature of the thermoplastic material of thermoplastic layer 132 and less than a melting point of the thermoplastic material of thermoplastic layer 132. For example, a thermoplastic layer 132 formed of a thermoplastic material having a melting point of 649° F. (343° C.) and a glass transition temperature of 249° F. (143° C.) may be heated to a pliable forming temperature of between 249° F. (143° C.) and 649° F. (343° C.). As will be appreciated by those skilled in the art, the suitable pliable forming temperature may vary depending on the particular type of thermoplastic material being used, as well as other factors, such as the thickness of thermoplastic layer 132. As used herein, the term "pliable forming temperature" may refer to a range of temperatures, wherein thermoplastic layer 132 is suitable for forming (usually equal to or greater than the glass transition temperature). In various embodiments, heating element 150 may be an infrared heater.

In accordance with various embodiments, AFP assembly 130 is configured to heat thermoplastic layer 132 with thermoplastic layer 132 spaced apart from mold surface 122 and lightning strike protection layer 128. In this regard, sealing member 140 may be configured to couple thermoplastic layer 132 to mold tool 120 such that thermoplastic layer 132 is initially (e.g., prior to heating) spaced apart from mold surface 122 and lightning strike protection layer 128. In response to heating, thermoplastic layer 132 becomes pliable and begins to translate toward mold surface 122 and lightning strike protection layer 128.

Figure 3C:
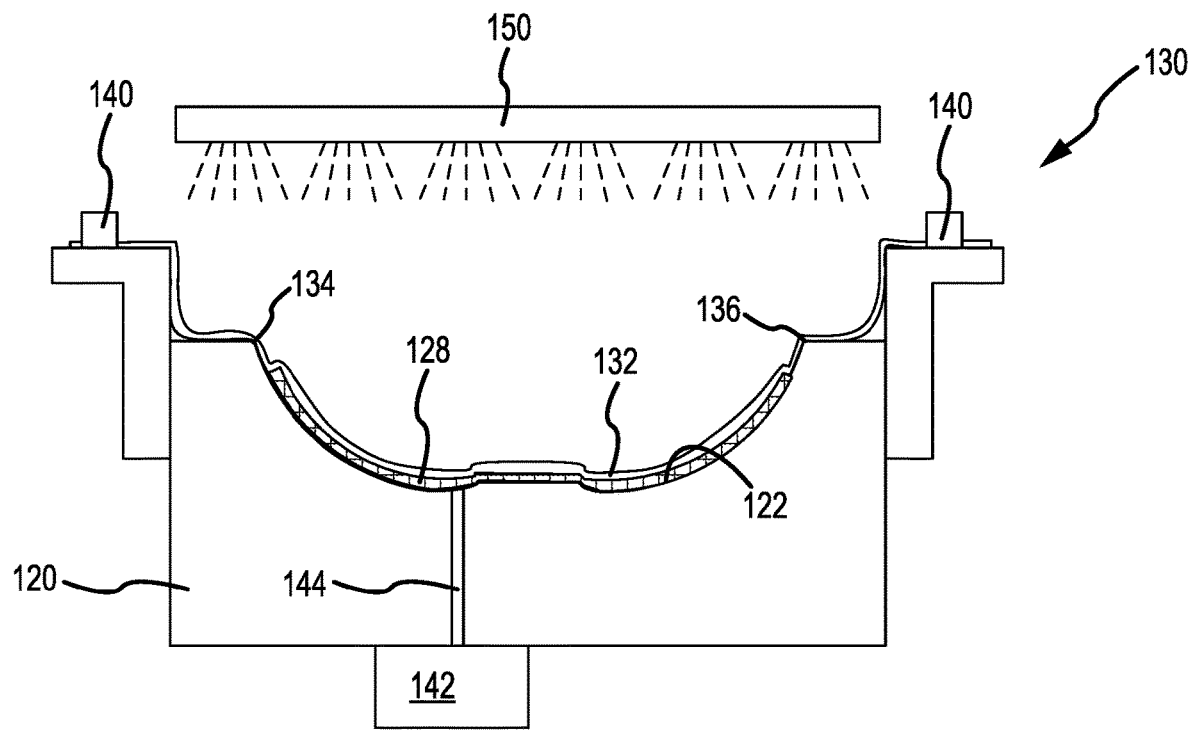

With additional reference to FIG. 3C, the pressure created by vacuum 142 forces thermoplastic layer 132, which is at a pliable forming temperature, into contact with lightning strike protection layer 128. The vacuum force further causes pliable thermoplastic layer 132 to conform to mold surface 122 such that thermoplastic layer 132 takes the shape (e.g., complements the contouring, curvatures and/or geometries) of mold surface 222. The force applied by thermoplastic layer 132 against lightning strike protection layer 128 forces conform to mold surface 122 such that lightning strike protection layer 128 also takes the shape (e.g., complements the contouring, curvatures and/or geometries) of mold surface 222.

A thickness of thermoplastic layer 132 and the pressure applied by vacuum 142 are configured such that thermoplastic layer 132 completely covers lightning strike protection layer 128. For example, while portions of thermoplastic layer 132 may be located in the open area between the wires of the metal mesh and/or may contact mold surface 122 at least a portion of thermoplastic layer 132 remains over the wires, such that during fiber strip deposition described below, the fiber strips contact the thermoplastic layer 132 rather than wires of the lightning strike protection layer 128.

Figure 3D:
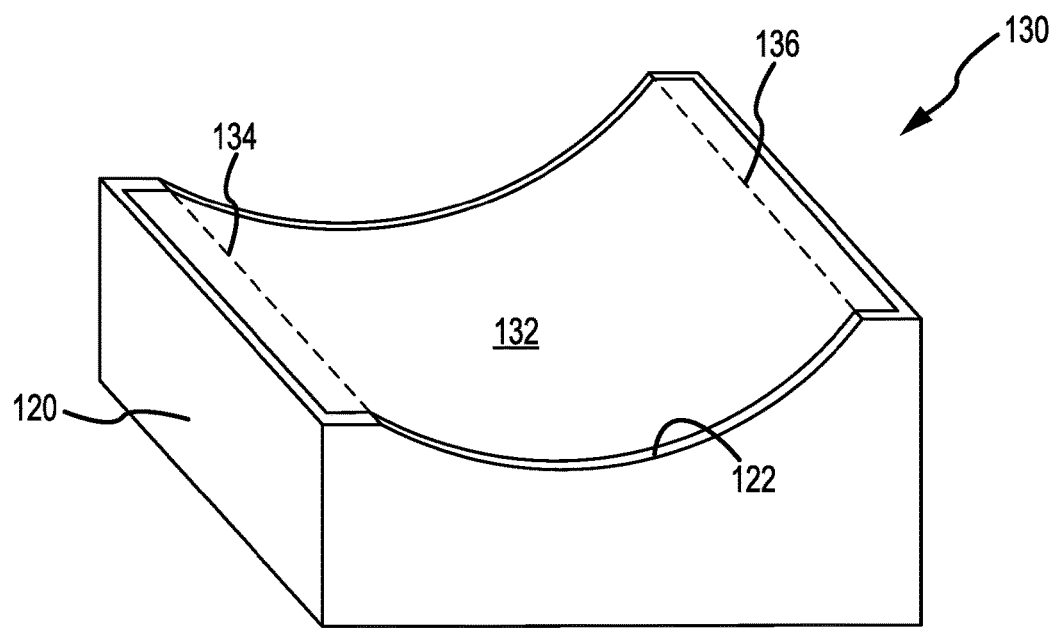

FIG. 3D shows thermoplastic layer 132 formed on mold surface 122 (and lightning strike protection layer 128). Heating element 150 may be removed (e.g., powered off) in response to thermoplastic layer 132 conforming to mold surface 122. In various embodiments, sealing member 140 may be removed and/or vacuum 142 may be turned off in response to thermoplastic layer 132 conforming to mold surface 122. In various embodiments, thermoplastic layer 132 may remain secured to mold tool 120 (e.g., via sealing member 140 or another means of securement) and/or under vacuum pressure (e.g., via vacuum 142), during the AFP process described below with reference to FIGS. 4A, 4B, 4C, and 4D. Locating thermoplastic layer 132 on lightning strike protection layer 128 tends to reduce, or prevent, movement of lightning strike protection layer 128 during the AFP process.

Figure 4A:
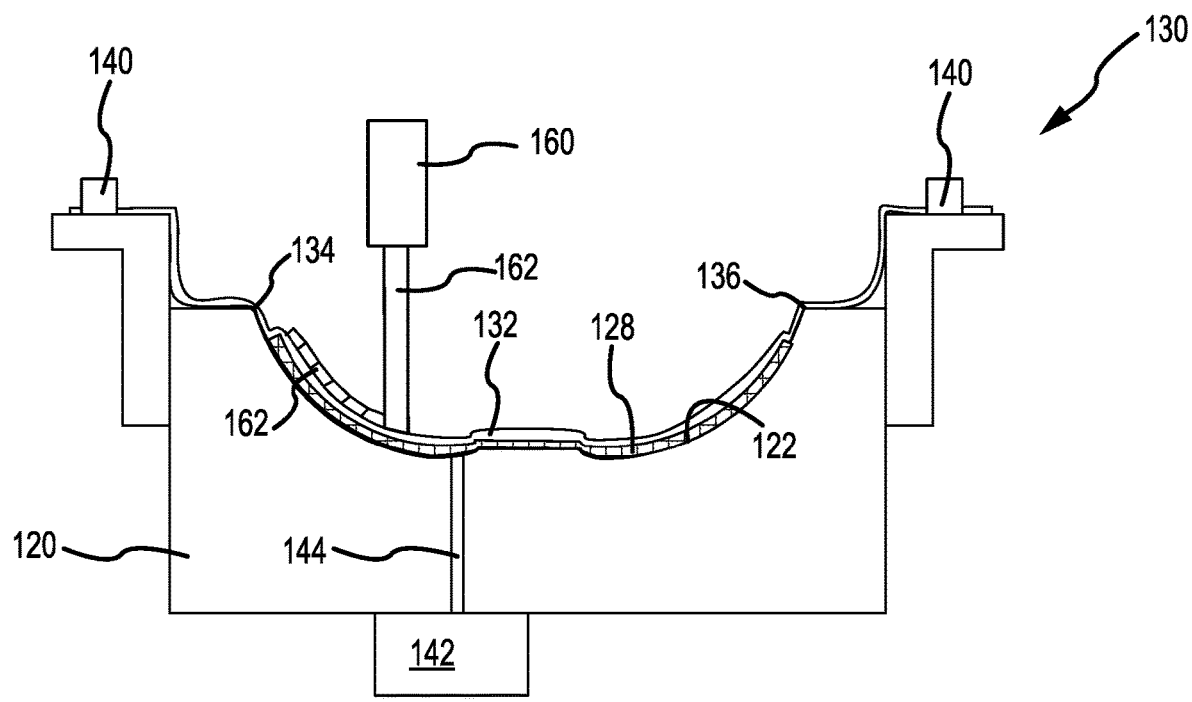
FIGS. 4A, 4B, 4C, and 4D illustrate deposition of fiber strips using an AFP assembly, in accordance with various embodiments.
Figure 4B:
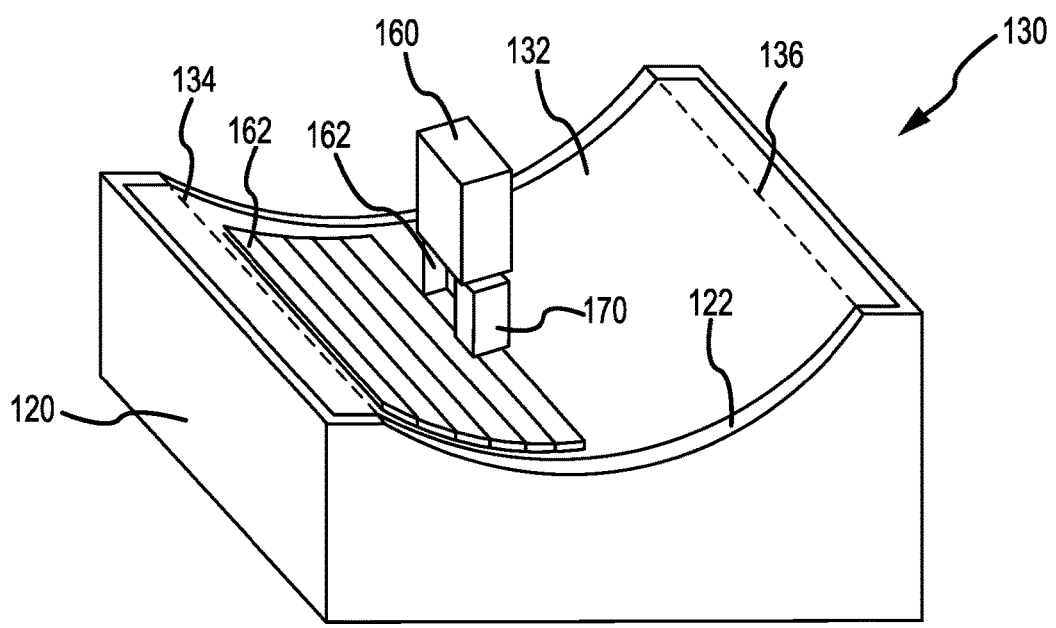

With reference FIGS. 4A and 4B, in accordance with various embodiments, a fiber dispensing assembly 160 is configured to dispense (e.g., deposit) fiber strips 162 over thermoplastic layer 132. Fiber dispensing assembly 160 may dispense fiber strips 162 adjacent to one another. In this regard, each new fiber strip 162 may be laid directly adjacent to the previously laid fiber strip 162.

Figure 6A:
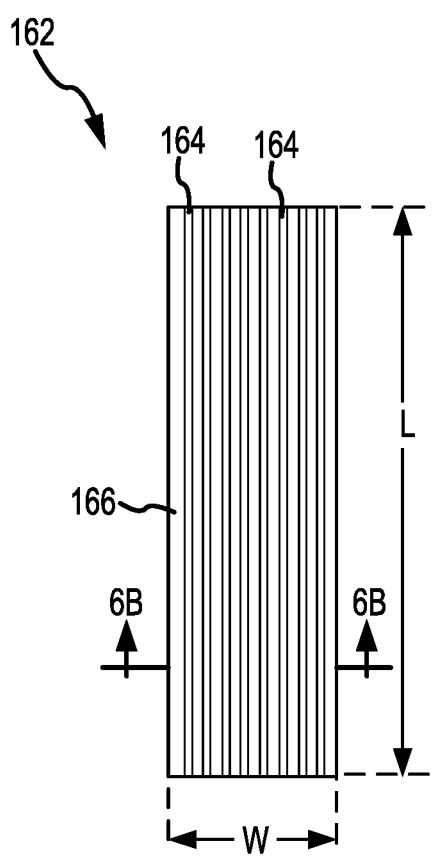
FIGS. 6A and 6B illustrate a plan view and a cross-section view, respectively, of a fiber strip, in accordance with various embodiments.
Figure 6B:
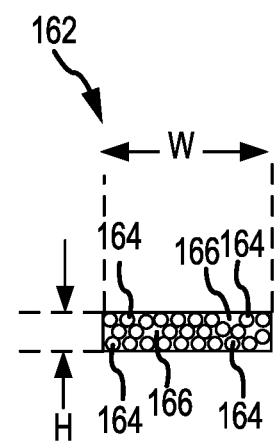

With momentary reference to FIGS. 6A and 6B, a plan view and a cross-section view, respectively, of a portion of a fiber strip 162 are illustrated. In accordance with various embodiments, fiber strip 162 comprises a plurality of fibers 164. Fibers 164 extend in a first direction or along the length L of fiber strips 162. In this regard, fiber strips 162 include a length (or first dimension) L, a width (or second dimension) W, and a height (or third dimension) H. Height H may be substantially less than the length L and width W, such that fiber strips 162 display flexibility relative to the plane formed by the length and width dimensions.

Fibers 164 may be carbon fibers, glass fibers, ceramic fibers, synthetic fibers such as poly-paraphenylene terephthalamide (KEVLAR), or any other suitable fiber. In various embodiments, fibers 164 are located within a matrix 166 of fiber strip 162. Matrix 166 may comprise a thermoplastic. In various embodiments, fiber strips 162 may comprise pre-impregnated carbon fiber tow, slit fiber tape, or any other fiber-reinforced material. In various embodiments, matrix 166 and thermoplastic layer 132 (FIG. 4A) are the same thermoplastic material.

Returning to FIGS. 4A and 4B, in various embodiments, fiber dispensing assembly 160 may include a consolidation element 170. Consolidation element 170 may be configured to apply heat and/or pressure to deposited fiber strips 162. The application of heat and/or pressure by consolidation element 170 melts the matrices of fiber strips 162 and thermoplastic layer 132, such that in response to consolidation, the matrices of fiber strips 162 are bonded (e.g., cross-linked) together and to thermoplastic layer 132. Consolidation element 170 is configured to heat fiber strips 162 and thermoplastic layer 132 above their respective melting points. The pressure applied by consolidation element 170 tends to force fiber strips 162 and/or thermoplastic layer 132 toward lightning strike protection layer 128 and also forces the lightning strike protection layer 128 into the melted matrix and thermoplastic layer 132. Stated differently, the melted matrix/thermoplastic layer flows into porosity of the metallic mesh, such that after consolidation, lightning strike protection layer 128 is secured with the matrix and thermoplastic layer 132. The force applied by consolidation element 170 also forces the matrix and thermoplastic layer 132 toward mold surface 122 thereby further facilitating the conformation of fiber strips 162 and/or thermoplastic layer 132 to the shape of mold surface 122.

Figure 4C:
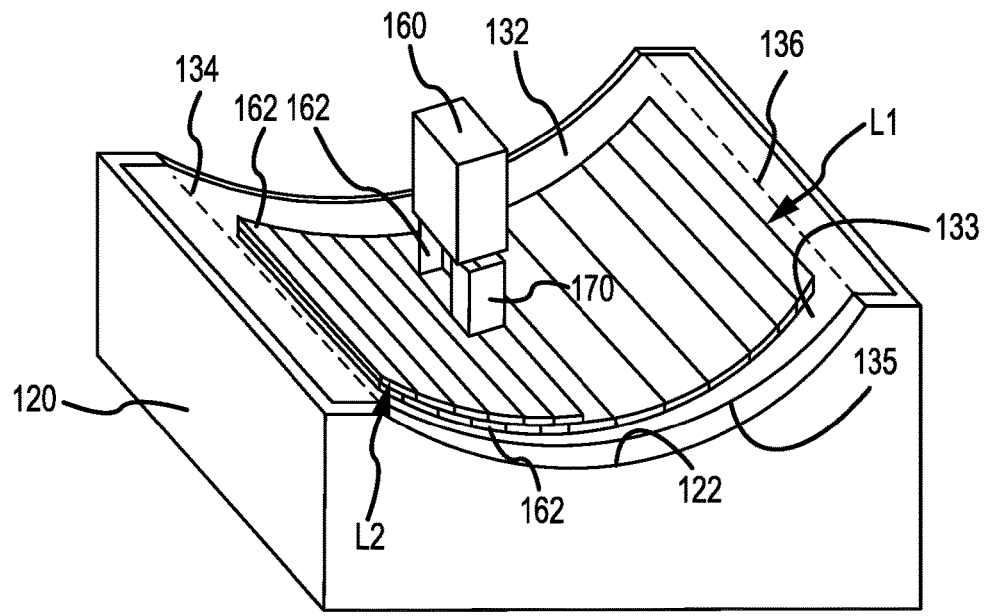

With additional reference to FIG. 4C, fiber dispensing assembly 160 may deposit a plurality of layers of fiber strips 162 on top of one another. For example, a first layer L1 of fiber strips 162 is deposited directly on (i.e., in contact with) surface 133 of thermoplastic layer 132. Surface 133 is opposite surface 135 of thermoplastic layer 132. Surface 135 contacts mold surface 122. Fiber dispensing assembly 160 then deposits a second layer L2 of fiber strips 162 on the first layer L1 of fiber strips 162. While FIG. 4C illustrates the fiber strips 162 of adjacent fiber strip layers L1, L2 being deposited in the same direction (e.g., parallel to first and second edges 134, 136), it is contemplated and understood that fiber dispensing assembly 160 may deposit fiber strips 162 in any direction and/or combinations of directions. For example, in various embodiments, the fiber strips 162 of second layer L2 may be laid in a direction substantially perpendicular to the direction in which the fiber strips 162 of first layer L1 were laid. Consolidation element 170 may be configured to apply heat and/or pressure to deposited fiber strips 162 of second layer L2. The application of heat and/or pressure by consolidation element 170 may simultaneously melt the matrices of the fiber strips 162 of first layer L1 and second layer L2, such that in response to consolidation, the matrices of the fiber strips 162 of layer L1 and of second layer L2 are bonded (e.g., cross-linked) together.

Figure 4D:
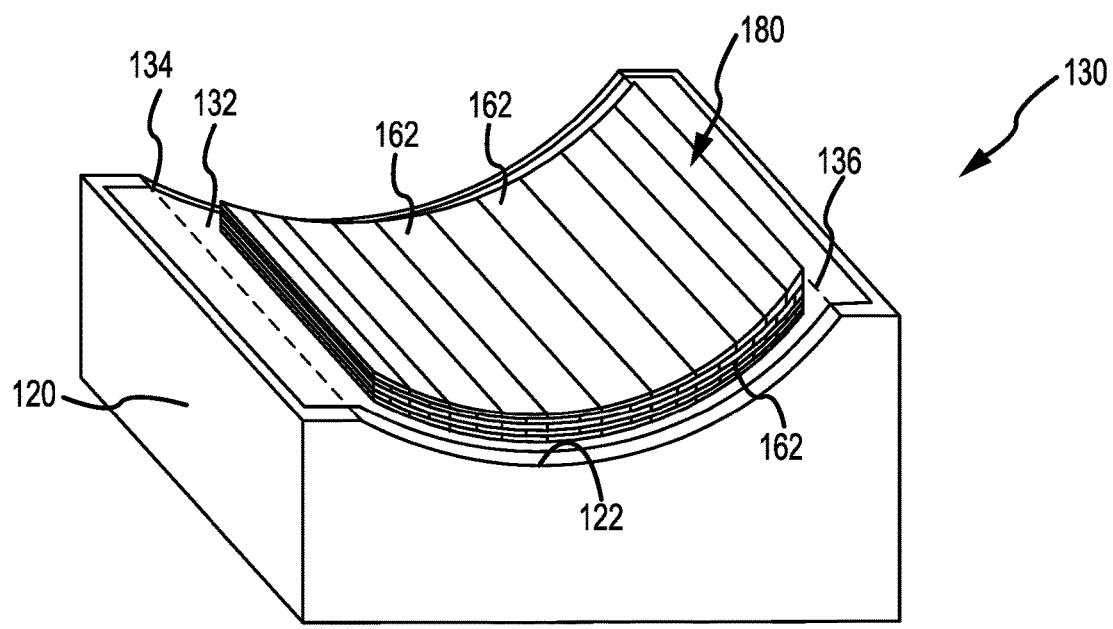

With additional reference to FIG. 4D, fiber dispensing assembly 160 continues depositing fiber strips 162 until a part 180 having the desired number of fiber strip layers is formed (e.g., when a desired part thickness is achieved). While FIGS. 4A, 4B, 4C, and 4D, show fiber strips 162 as distinguishable from one another, it is contemplated and understood that after consolidation (e.g., after the matrices have been melted together) fiber strips 162 are generally indistinguishable from one another. In various embodiments, fiber strips 162 may be consolidated after the desired number of fiber strip layers have been deposited (e.g., desired part thickness is achieved). For example, in various embodiments, after all of the fiber strips 162 are deposited, mold tool 120 and the fiber strip layup formed thereon may be placed in an oven and/or in a vacuum bag, wherein heat and vacuum pressure are applied to the fiber strips 162. Consolidating all of the fiber strips 162 simultaneously tends to decrease manufacturing times.

FIG. 5 shows part 180 after removal from mold tool 120. With combined reference to FIG. 5 and FIG. 4D, after the final fiber strip layer is consolidated, part 180 is removed from mold tool 120. In various embodiments, the part 180 (and thermoplastic layer 132, which now part of part 180)

may be removed from mold tool 120 by turning off vacuum 142 (FIG. 4A). With the vacuum pressure removed, the part 180 may be pulled off of mold surface 122. In various embodiments, part 180 may be trimmed, or cut, to the desired dimensions after removing the part 180 from mold tool 120. In various embodiments, part 180 may be first outer skin 110a.

In various embodiments, stiffeners, doublers, or other buildup layers may be added to part 180. The additional buildup layers may be located on fiber strip 162 over mold tool 120. The buildup layers may be attached to part 180 using any suitable attachment technique (e.g., ultrasonic welding, thermo-pressing, etc.). The buildup layers may be applied after consolidation of fiber strips 162 or prior to consolidation, such that attachment (e.g., bonding) of the buildup layers occurs during consolidation of fiber strips 162.

Figure 7A:
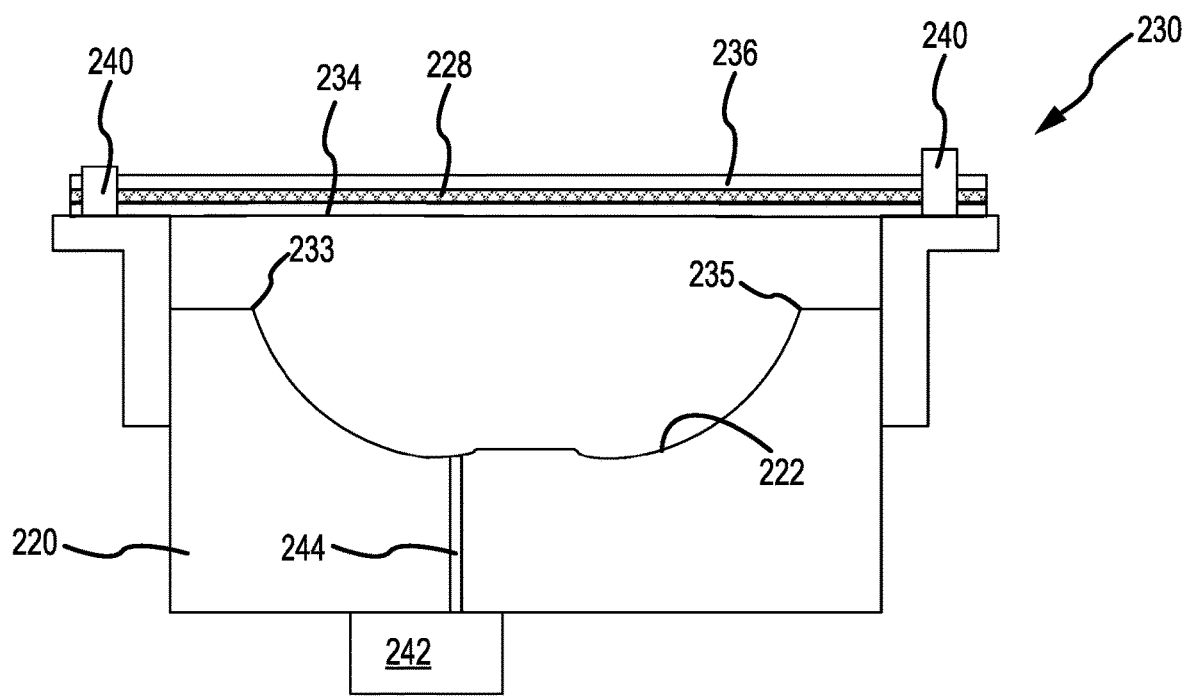
FIGS. 7A, 7B, 7C, and 7D illustrate formation of a fiber-reinforced composite part having a lightning strike protection layer using an AFP assembly, in accordance with various embodiments.

With reference to FIG. 7A, an AFP assembly 230 for forming a fiber-reinforced thermoplastic part is illustrated, in accordance with various embodiments. AFP assembly 230 includes a mold tool 220 defining a mold surface 222. Mold tool 220 is configured to receive and support deposition of fiber strips during an AFP operation. Mold tool 220 may be similar to mold tool 120, as described above, with reference to FIG. 2.

AFP assembly 230 is configured to deposit a first thermoplastic layer 234, a second thermoplastic layer 236, and a lightning strike protection layer 228 on mold surface 122. Each of first thermoplastic layer 234 and second thermoplastic layer 236 may be formed of thermoplastic polymer, PEI, PC, PSU, PES, PVDF, PTFE, PPS, PEEK, PEKK, PAEK, or any other suitable thermoplastic. In accordance with various embodiments, first and second thermoplastic layers 234, 236 may each in the form of a sheet configured to cover mold surface 222. In this regard, first and second thermoplastic layers 234, 236 may each be a single, unibody member that extends continuously from a first edge 233 of mold surface 222 to a second, opposing edge 235 of mold surface 222. In accordance with various embodiments, a length and width of each of first and second thermoplastic layers 234, 236 are equal to or greater than the length and width, respectively, of the final composite part. First and second thermoplastic layers 234, 236 may be formed solely of thermoplastic. In this regard, first and second thermoplastic layers 234, 236 may be devoid of fibers.

Lightning strike protection layer 228 may be located between first thermoplastic layer 234 and second thermoplastic layer 236. Lightning strike protection layer 228 be a metallic mesh. For example, lightning strike protection layer 228 may be wire mesh having wires of copper, aluminum, titanium, or any other metal or metal alloy. A height (or wire dimeter) of lightning strike protection layer 228 is such that lightning strike protection layer 228 displays flexibility relative to the plane formed by the length and width dimensions of lightning strike protection layer 228.

In accordance with various embodiments, first thermoplastic layer 234, lightning strike protection layer 228, and second thermoplastic layer 236 may be coupled to the mold tool 220 For example, in various embodiments, a sealing member 240 of AFP assembly 230 may be located around the perimeter of first thermoplastic layer 234, lightning strike protection layer 228, and second thermoplastic layer 236 and may form an airtight seal between the mold tool 120 and first thermoplastic layer 234, lightning strike protection layer 228, and second thermoplastic layer 236. Sealing member 240 may comprise a tape, clamp, frame, clip, or any other structure capable of forming an airtight seal. A vacuum 242 (e.g., a vacuum pump or vacuum generator) may be coupled to mold tool 220. Vacuum 242 may be configured to evacuate the air from between mold surface 222 and first thermoplastic layer 234. For example, in various embodiments, mold tool 220 defines a channel 244 extending to mold surface 222. Vacuum 242 may be fluidly coupled to channel 244, such that vacuum 242 evacuates the air from between first thermoplastic layer 234 and mold surface 222 via channel 244.

Figure 7B:
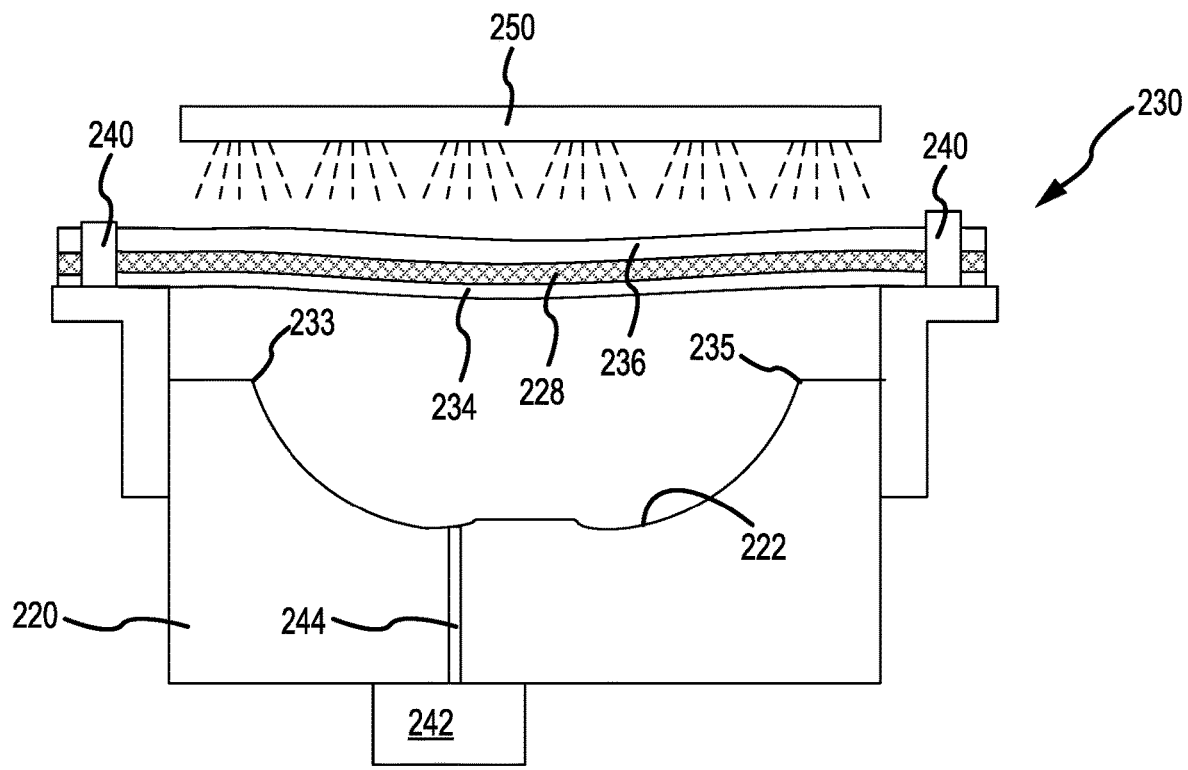

With reference to FIG. 7B, in accordance with various embodiments, a heating element 250 of AFP assembly 230 is configured to heat first and second thermoplastic layers 234, 236 to a sufficient pliable forming temperature, wherein the thermoplastic material of each of first and second thermoplastic layers 234, 236 becomes pliable for forming purposes. Prior to heating, first and second thermoplastic layers 234, 236 may be rigid or generally non-pliable. In accordance with various embodiments, a pliable forming temperature for a thermoplastic material may be between 190° and 750° Fahrenheit (F) (87.8°-398.9° Celsius (C)). In various embodiments, the pliable forming temperature for each of first and second thermoplastic layers 234, 236 is greater than or equal to a glass transition temperature of the thermoplastic material of first and second thermoplastic layers 234, 236 and less than a melting point of the thermoplastic material of first and second thermoplastic layers 234, 236. As will be appreciated by those skilled in the art, the suitable pliable forming temperature may vary depending on the particular type of thermoplastic material being used for each of first and second thermoplastic layers 234, 236, as well as other factors, such as the thickness of first and second thermoplastic layers 234, 236. In various embodiments, heating element 250 may be an infrared heater.

In accordance with various embodiments, AFP assembly 230 is configured to heat first and second thermoplastic layers 234, 236 with first and second thermoplastic layers 234, 236 and lightning strike protection layer 228 spaced apart from mold surface 222. In this regard, sealing member 240 may be configured to couple first and second thermoplastic layers 234, 236 and lightning strike protection layer 228 to mold tool 220 such that first and second thermoplastic layers 234, 236 and lightning strike protection layer 228 are initially (e.g., prior to heating) spaced apart from mold surface 222. In response to heating, thermoplastic material of first and second thermoplastic layers 234, 236 becomes pliable and begins translating toward mold surface 222.

Figure 7C:
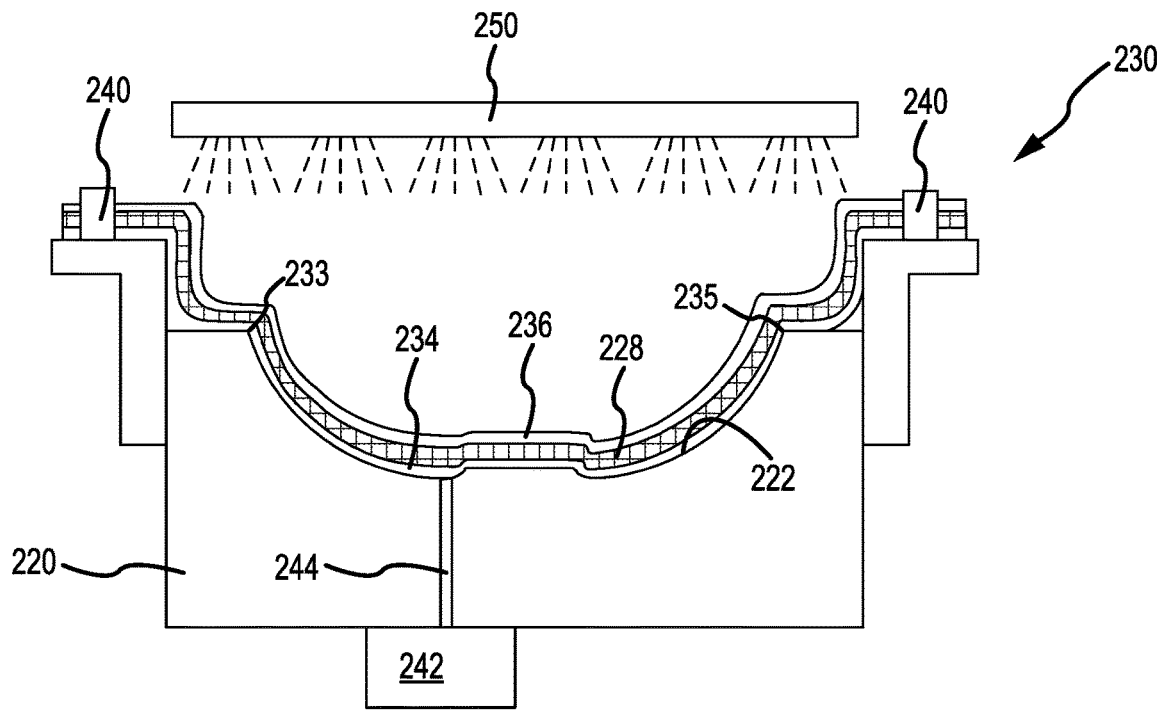

With additional reference to FIG. 7C, the pressure created by vacuum 242 forces first and second thermoplastic layers 234, 236, which are at a pliable forming temperature, toward mold surface 222. Lightning strike protection layer 128, which is sandwiched between first thermoplastic layer 234 and second thermoplastic layer 236, is also forced toward mold surface 222 by first and second thermoplastic layers 234, 236. The vacuum forces first thermoplastic layer 234 into contact with mold surface 222 and causes first and second thermoplastic layers 234, 236 and lightning strike protection layer 228 to conform to mold surface 222. The force applied by second thermoplastic layer 236 against lightning strike protection layer 228, along with the flexibility of lightning strike and pliability of first and second thermoplastic layers 234, 236, forces lightning strike protection layer 228 to conform to mold surface 222.

Figure 7D:
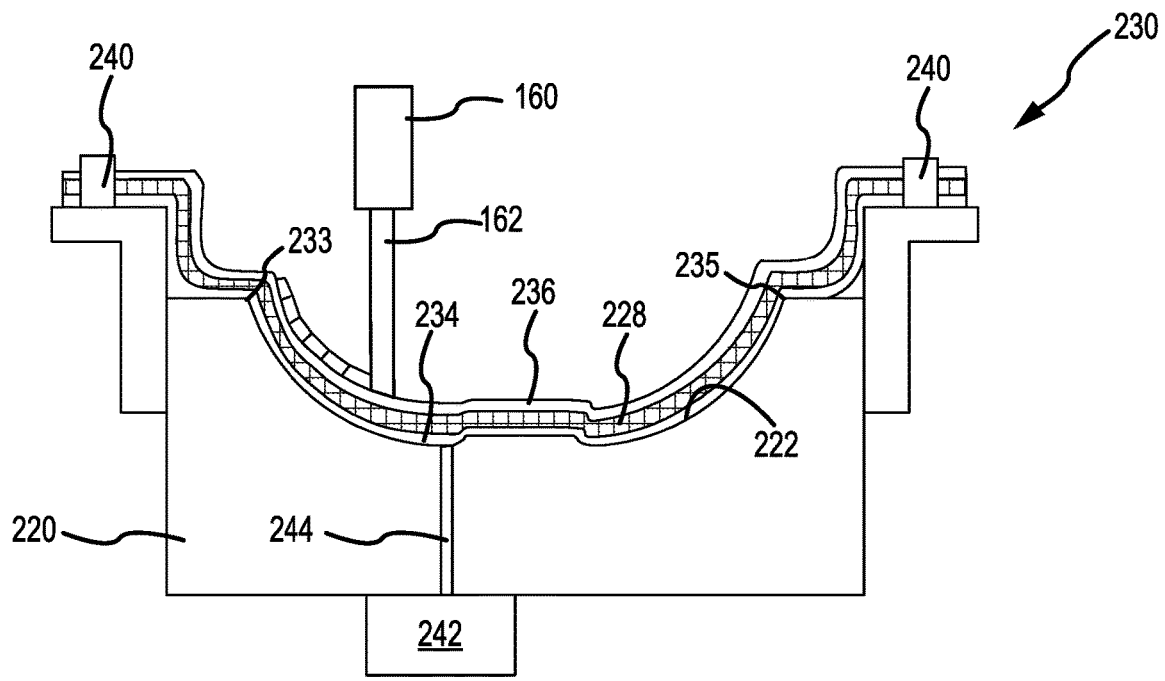

FIG. 7D shows fiber dispensing assembly 160, as described above with reference to FIGS. 4A, 4B, and 4C, depositing fiber strips 162 on second thermoplastic layer 236. A thickness of each of first and second thermoplastic layers 234, 236 and the pressure applied by vacuum 242 are configured such that, after conforming to mold surface 222, second thermoplastic layer 236 completely covers lightning strike protection layer 228. For example, while portions of second thermoplastic layer 236 may be located in open areas between the wires of the metal mesh, at least a portion of second thermoplastic layer 236 remains over the wires, such that during the fiber strip deposition, the fiber strips 162 contact second thermoplastic layer 236 rather than the wires of lightning strike protection layer 228.

In various embodiments, sealing member 240 may be removed and/or vacuum 242 may be turned off prior to the deposition of fiber strips 162. In various embodiments, first and second thermoplastic layers 234, 236 and lightning strike protection layer 228 may remain secured to mold tool 220 (e.g., via sealing member 240 or another means of securement) and/or under vacuum pressure (e.g., via vacuum 242), during deposition of fiber strips 162. Locating lightning strike protection layer 228 between first thermoplastic layer 234 and second thermoplastic layer 236 tends to reduce, or prevent, movement of lightning strike protection layer 228 during the AFP process.

Fiber dispensing assembly 160 continues depositing fiber strips 162 until a part having the desired number of fiber strip layers is formed (e.g., when a desired part thickness is achieved). In various embodiments, fiber strips 162 may be consolidated in-situ by consolidation element 170. Consolidation element 170 may apply heat and pressure to the deposited fiber strips 162. The heat and pressure applied by consolidation element 170 to the first layer of fiber strips 162 is sufficient to melt first and second thermoplastic layers 234, 236 and the matrix 166 (FIG. 6B) of the fiber strips 162, such that in response to consolidation, the matrices of fiber strips 162 are bonded (e.g., cross-linked) together and to first and second thermoplastic layers 234, 236. Melting first and second thermoplastic layers 234, 236, with lightning strike protection layer 228 located therebetween, allows first and second thermoplastic layers 234, 236 to bond (e.g., cross-link) with one another through the openings in the wire mesh of lightning strike protection layer 228, thereby securing lightning strike protection layer 228 within first and second thermoplastic layers 234, 236. In various embodiments, consolidation is performed after the desired number of fiber strip layers have been deposited (e.g., after the desired part thickness is achieved). For example, in various embodiments, after all of the fiber strips 162 are deposited, mold tool 220 and the fiber strip layup formed thereon may be placed in an oven and/or in a vacuum bag, wherein heat and pressure (e.g., vacuum) are applied to the fiber strips 162.

After consolidation, the formed part (e.g., part 180) is removed from mold tool 220. In various embodiments, the part, which includes first and second thermoplastic layers 234, 236 and lightning strike protection layer 228, may be removed from mold tool 220 by turning off vacuum 242. With the vacuum pressure removed, the part may be pulled off of mold surface 222. In various embodiments, the part may be trimmed, or cut, to the desired dimensions after removing the part from mold tool 220. In various embodiments, part may be first outer skin 110a.

Figure 8A:
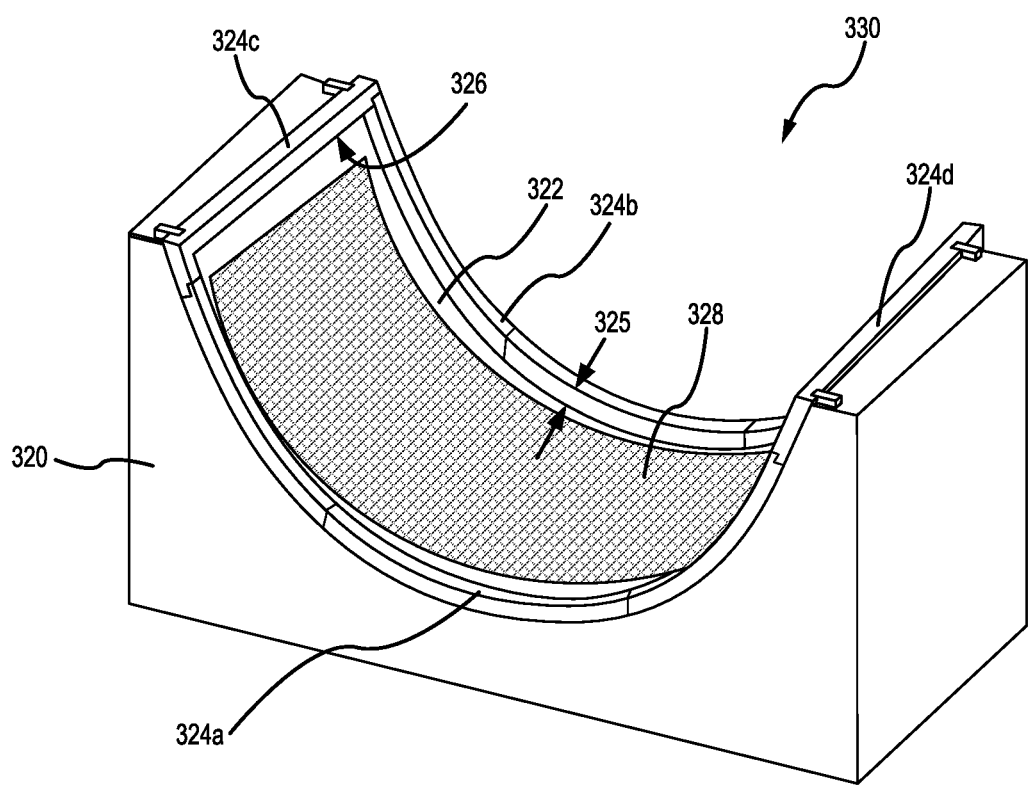
FIGS. 8A, 8B, 8C, 8D, 8E, and 8F illustrate deposition of a lightning strike protection layer and a thermoplastic layer over a mold tool of an AFP assembly, in accordance with various embodiments.

Referring to FIG. 8A, a mold tool 320 of an AFP assembly 330 is illustrated, in accordance with various embodiments. Mold tool 320 and AFP assembly 330 may be used to form part 180 (FIG. 5). Mold tool 320 is configured to receive and support deposition of fiber strips during an AFP operation, for example, the AFP process described in FIGS. 4A, 4B, 4C, and 4D. Mold tool 320 includes a mold surface 322. Mold surface 322 may include various contouring and/or curvatures and/or complex geometries (e.g. protrusions, surface angles, etc.). After completion of the AFP operation, the finished component retains and complements the shape of mold surface 322. In various embodiments, mold surface 322 has a contour matching, or complementing, the desired geometry of first and second outer skins 110a, 110b, with momentary reference to FIG. 1.

A lightning strike protection layer 328 may be located on mold surface 322 of mold tool 320. The lightning strike protection layer 328 be a metallic mesh. For example, lightning strike protection layer 328 may be wire mesh having wires of copper, aluminum, titanium, or any other metal or metal alloy. A height (or wire dimeter) of lightning strike protection layer 328 is such that lightning strike protection layer 328 displays flexibility relative to the plane formed by the length and width dimensions of lightning strike protection layer 328.

Mold tool 320 includes attachment frames 324a, 324b, 324c, and 324d. Attachment frames 324a, 324b, 324c, and 324d may bound mold surface 322 (e.g., attachment frames 324a, 324b, 324c, and 324d may be located around and/or may surround mold surface 322). In various embodiments, attachment frame 324a and attachment frame 324b each have a curved shape. For example, attachment frame 324a and attachment frame 324b may each form a half circle (e.g., approximately 180° of a circle). Attachment frame 324b may be located on an opposite end of mold surface 322 relative to attachment frame 324a. In various embodiments, each of attachment frame 324a and attachment frame 324b may be raised relative to mold surface 322. In this regard, attachment frame 324a and attachment frame 324b may create a lip 325 relative to mold surface 322. Attachment frame 324c and attachment frame 324d each extend between attachment frame 324a and attachment frame 324b. Attachment frame 324c and attachment frame 324d may each have a generally straight, or planar portion. In this regard, attachment frames 324a, 324b, 324c, and 324d may together form a half cylinder. Attachment frame 324d may be located on an opposite end of mold surface 322 relative to attachment frame 324c. In various embodiments, each of attachment frame 324c and attachment frame 324d may be raised relative to mold surface 322. In this regard, attachment frame 324c and attachment frame 324c may each create a lip 326 relative to mold surface 322.

Figure 8B:
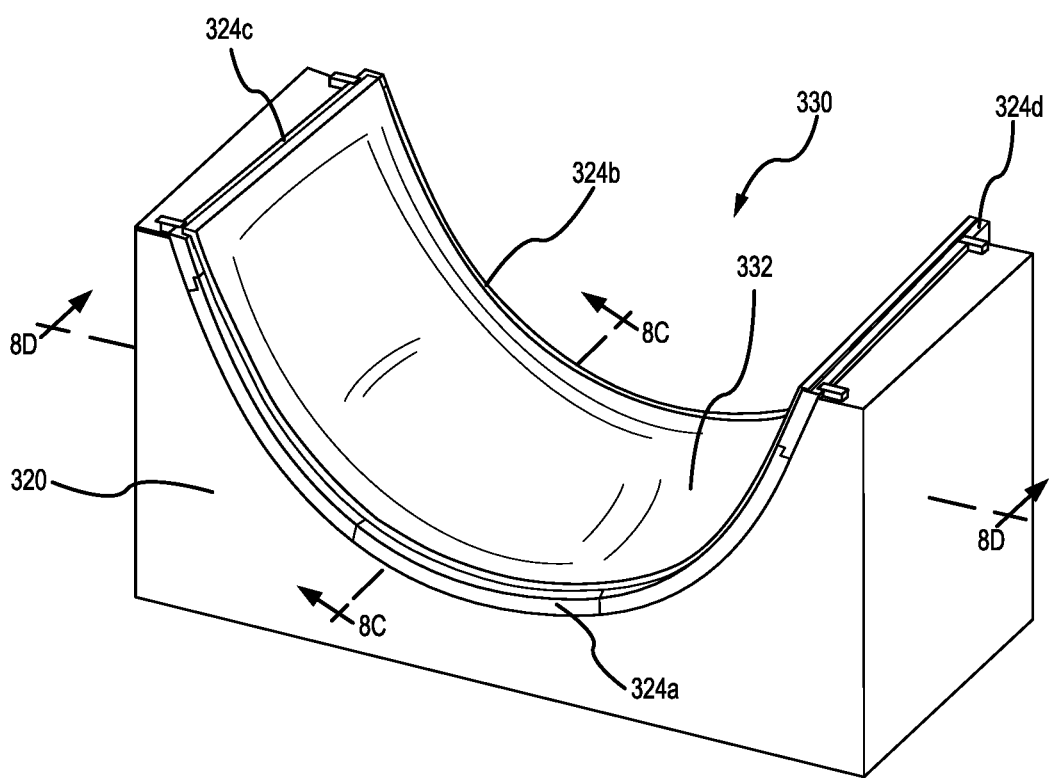

With reference to FIGS. 8B, in accordance with various embodiments, AFP assembly 330 is configured to deposit a thermoplastic layer 332 and lightning strike protection layer 328 over mold tool 320. Thermoplastic layer 332 may be formed of thermoplastic polymer, PEI, PC, PSU, PES, PVDF, PTFE, PPS, PEEK, PEKK, PAEK, or any other suitable thermoplastic. In accordance with various embodiments, thermoplastic layer 332 is configured to be attach to mold tool 320 at attachment frames 324a, 324b, 324c, 324d. Thermoplastic layer 332 may be a single, unibody member that extends continuously from attachment frame 324a to attachment frame 324 and from attachment frame 324c to attachment frame 324. Thermoplastic layer 332 may be formed solely of thermoplastic. In this regard, thermoplastic material may be devoid of fibers.

Figure 8C:
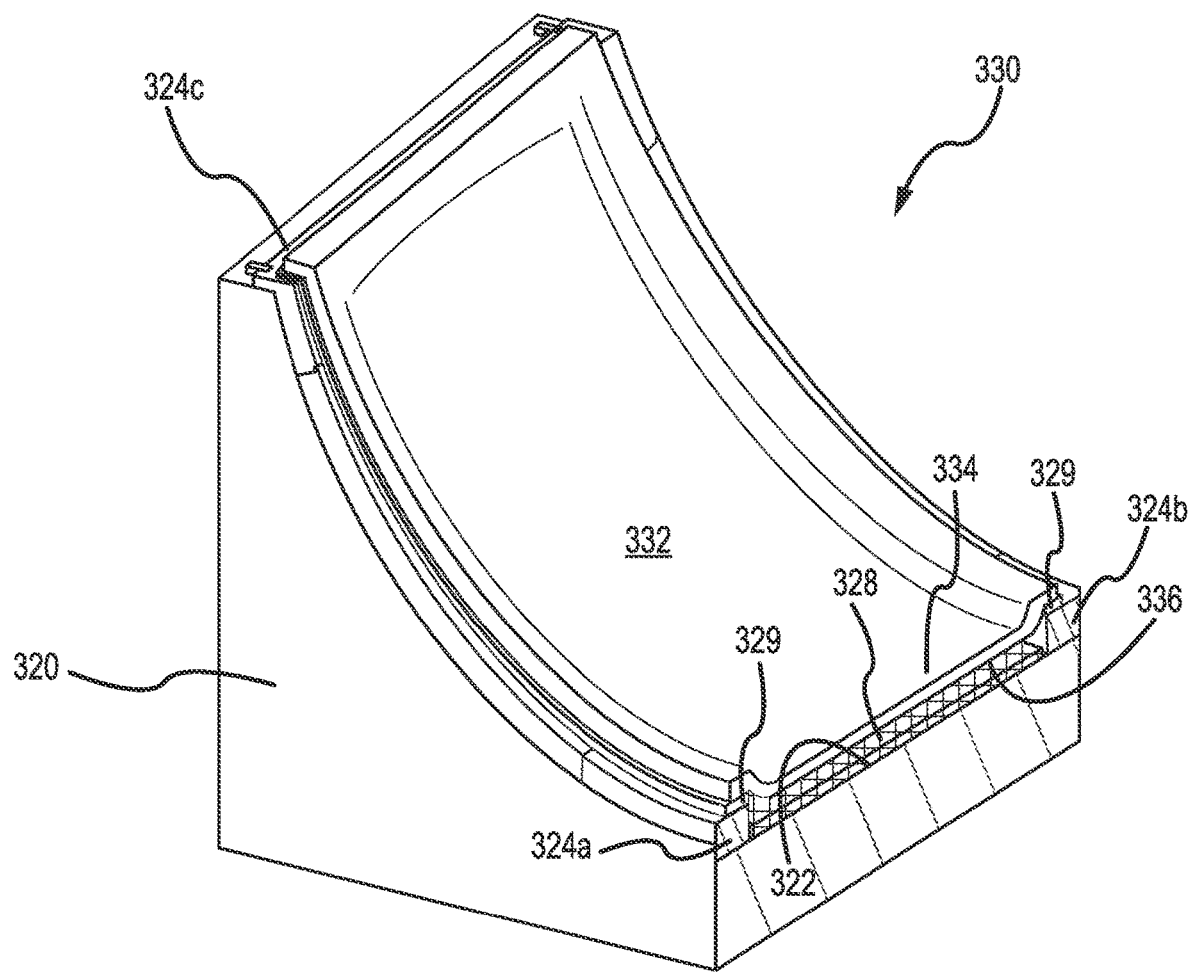
Figure 8D:
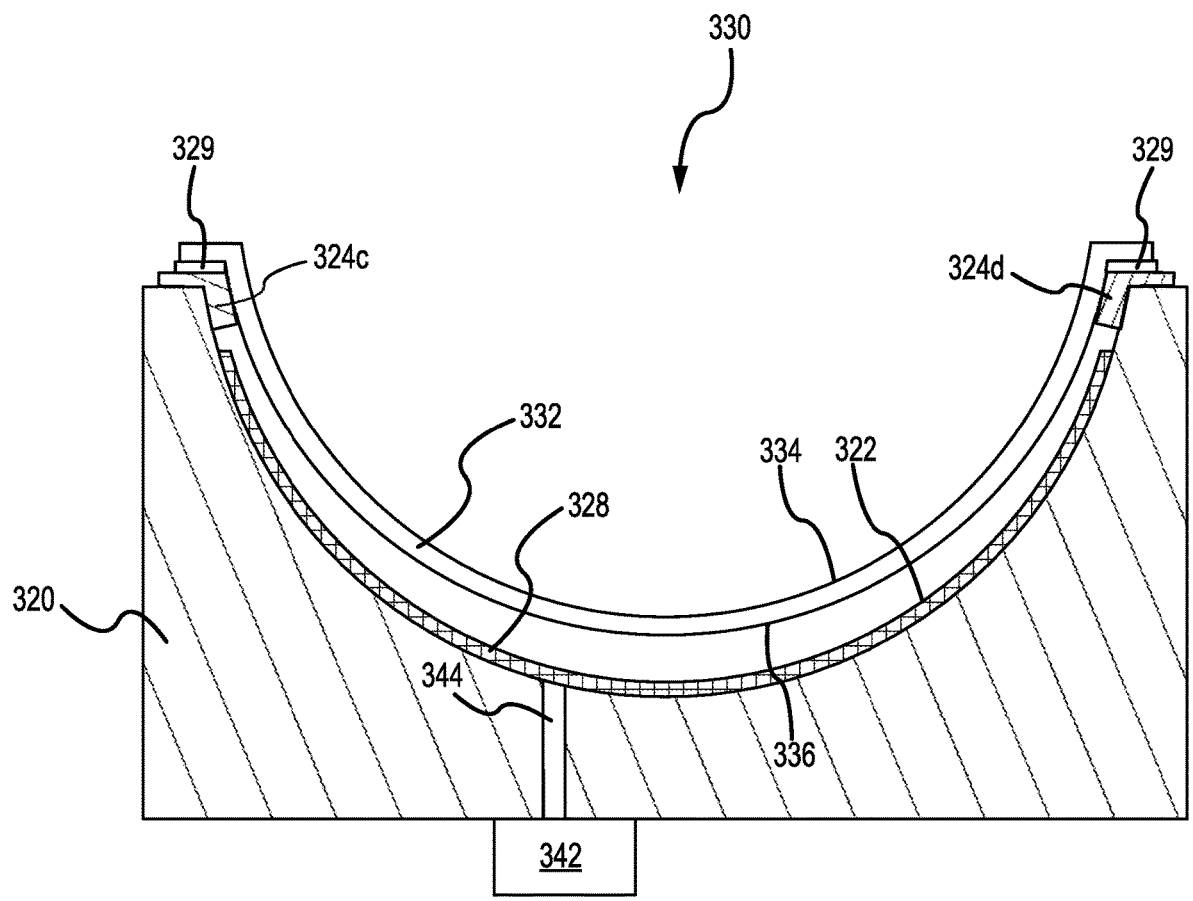

FIG. 8C shows a perspective cross section taken along the line 8C-8C in FIG. 8B. FIG. 8D shows a cross section taken along the line 8D-8D in FIG. 8B. With combined reference to FIGS. 8B, 8C, and 8D, a tape 329 (e.g., sealing/tacking tape; of a double-sided adhesive configuration) may be applied between thermoplastic layer 332 and attachment frames 324a, 324b, 324c, and 324d to secure the thermoplastic layer 332 relative to the mold tool 320. As such, the tape 329 is a representative example of the above-noted sealing member 140. Tape 329 may form an airtight seal between thermoplastic layer 332 and attachment frames 324a, 324b, 324c, and 324d. In various embodiments, a clamp, top frame, clip, or any other structure capable of forming an airtight seal around thermoplastic layer 332 may be employed instead of, or in addition to, tape 329.

A vacuum 342 (e.g., a vacuum pump or vacuum generator) may be coupled to mold tool 320. Vacuum 342 may be configured to evacuate the air from between mold surface 322 and thermoplastic layer 332. For example, in various embodiments, mold tool 320 defines a channel 344 extending to mold surface 322. Vacuum 342 may be fluidly coupled to channel 344, such that vacuum 342 evacuates the air from between thermoplastic layer 332 and mold surface 322 of mold tool 320 via channel 344.

Figure 8E:
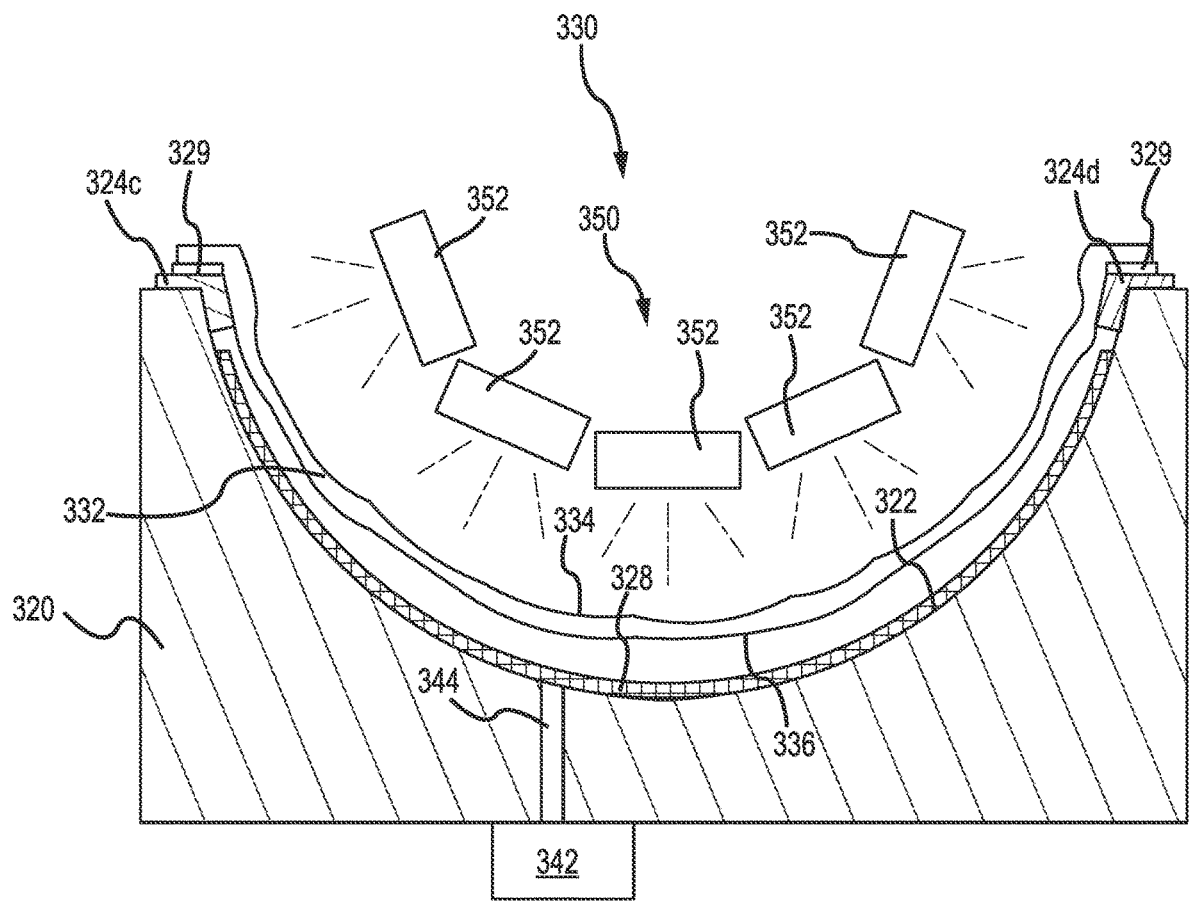
Figure 8F:
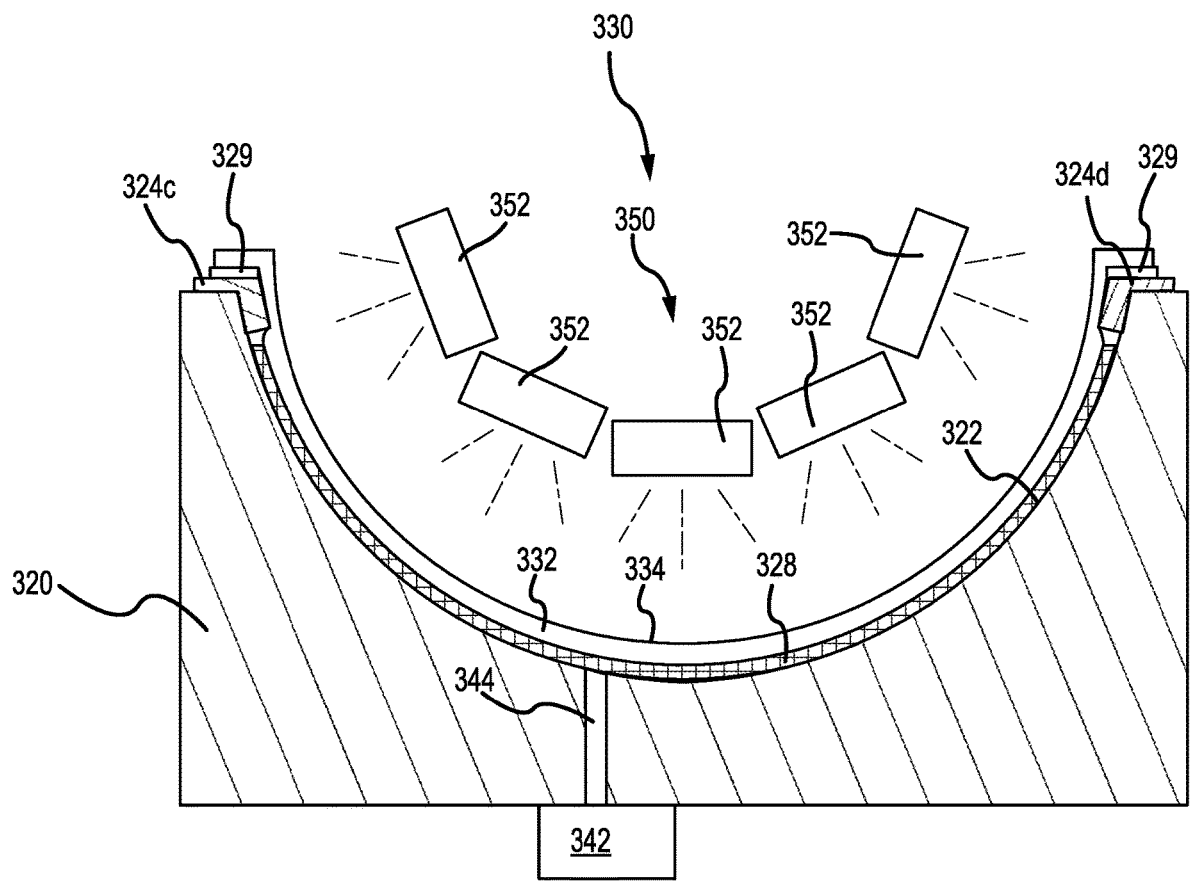

With reference to FIG. 8E, in accordance with various embodiments, AFP assembly 330 further includes a heating element 350 having a plurality of heater units 352 (e.g., infrared heat lamps) that are collectively positioned to at least generally follow the contour of the mold surface 322. The cross-section view of AFP assembly 330 shown in FIG. 8E and FIG. 8F is the same cross section as shown in FIG. 8D. The various heater units 352 may be at least substantially equally-spaced from the thermoplastic layer 332. For example, heater units 352 may be at least substantially equally-spaced from an exterior surface 334 of thermoplastic layer 332. Exterior surface 334 is oriented away from mold surface 322 of mold tool 320. In various embodiments, exterior surface 334 may have a generally concave shape prior to heating. One or more of the heater units 352 may be disposed in a different orientation, including where each heater unit 352 is disposed in a different orientation.

Heater units 352 are configured to heat thermoplastic layer 332 to a sufficient pliable forming temperature, wherein the thermoplastic layer 332 becomes pliable for forming purposes. In various embodiments, the pliable forming temperature for the thermoplastic layer 332 is greater than or equal to a glass transition temperature of thermoplastic layer 332 and less than a melting point of the thermoplastic layer 332. As will be appreciated by those skilled in the art, the suitable pliable forming temperature may vary depending on the particular type of thermoplastic material being used, as well as other factors, such as the thickness of thermoplastic layer 332. As used herein, the term "pliable forming temperature" may refer to a range of temperatures, wherein thermoplastic layer 332 is suitable for forming (usually at or above the glass transition temperature). In various embodiments, heating element 350 may be an infrared heater.

In accordance with various embodiments, AFP assembly 330 is configured to heat thermoplastic layer 332 with thermoplastic layer 332 spaced apart from mold surface 322 and lightning strike protection layer 328. In this regard, attachment frames 324a, 324b, 324c, and 324d may couple thermoplastic layer 332 to mold tool 320 such that an interior surface 336 of thermoplastic layer 332 is initially (e.g., prior to heating) spaced apart from mold surface 322 and lightning strike protection layer 328. Interior surface 336 is oriented away from exterior surface 334 and toward mold surface 322 and lightning strike protection layer 328. In response to heating, thermoplastic layer 332 becomes pliable and begins to translate toward mold surface 322 and lightning strike protection layer 328.

With additional reference to FIG. 8F, the pressure created by vacuum 342 forces thermoplastic layer 332, which is at a pliable forming temperature, into contact with lightning strike protection layer 328. The vacuum force further causes pliable thermoplastic layer 332 to conform to mold surface 322 such that thermoplastic layer 332 takes the shape (e.g., complements the contouring, curvatures and/or geometries) of mold surface 322. The force applied by thermoplastic layer 332 against lightning strike protection layer 328 forces conform to mold surface 322 such that lightning strike protection layer 328 also takes the shape (e.g., complements the contouring, curvatures and/or geometries) of mold surface 222. A thickness of thermoplastic layer 332 and the pressure applied by vacuum 342 are configured such that thermoplastic layer 332 completely covers lightning strike protection layer 328. For example, while portions of thermoplastic layer 332 may be located in the open area between the wires of the metal mesh and/or may contact mold surface 322 at least a portion of thermoplastic layer 332 remains over the wires, such that during fiber strip deposition described in FIGS. 4A-4D, the fiber strips contact the thermoplastic layer 332 rather than wires of the lightning strike protection layer 328.

In accordance with various embodiments, once thermoplastic layer 332 has conformed to mold surface 322, an AFP process, as described above with reference to FIGS. 4A, 4B, 4C, and 4D, may be performed over thermoplastic layer 332. In various embodiments, vacuum 342 may be turned off in response to thermoplastic layer 332 conforming to mold surface 322. In various embodiments, thermoplastic layer 332 may remain under vacuum pressure (e.g., via vacuum 342), during the AFP process.

Figure 9A:
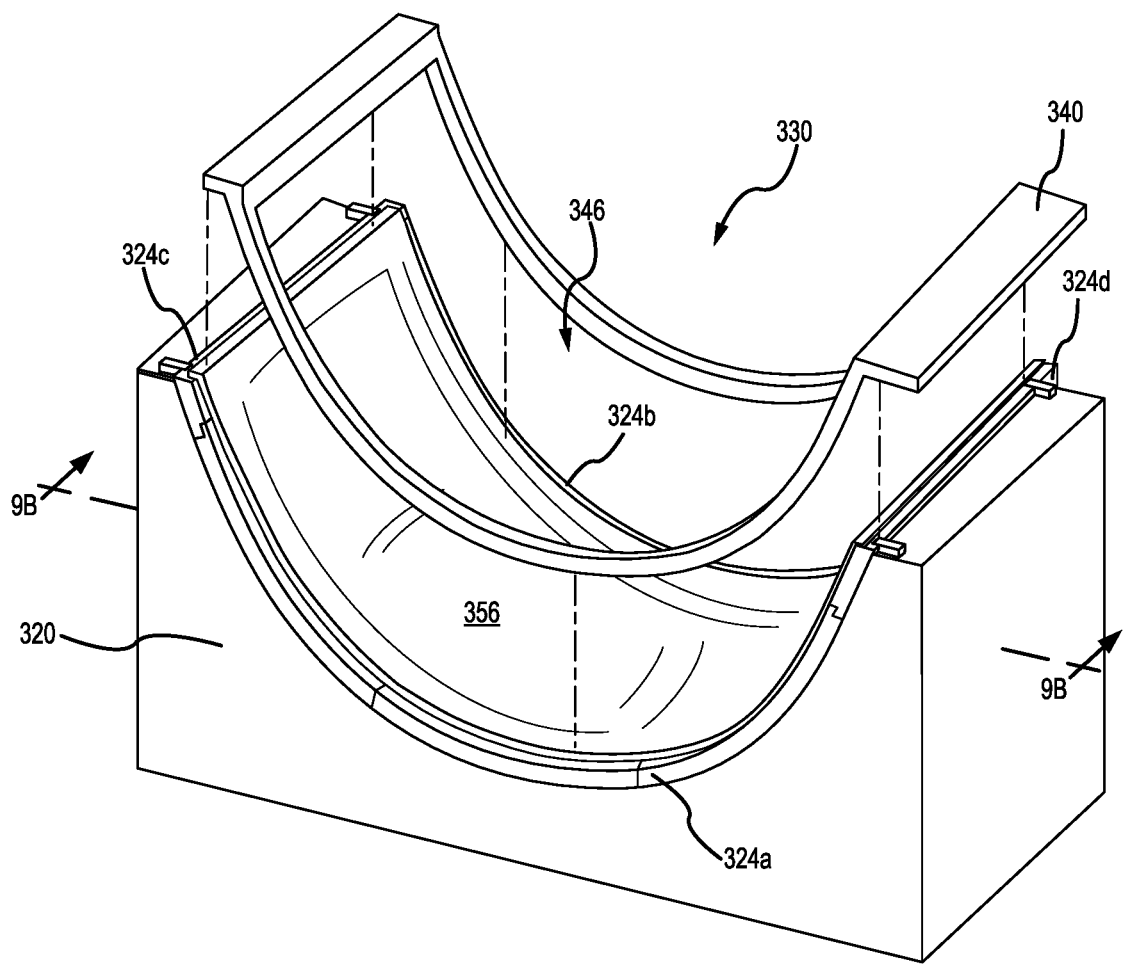
FIGS. 9A, 9B, and 9C illustrate formation of a fiber-reinforced composite part having a lightning strike protection layer using an AFP assembly, in accordance with various embodiments.
Figure 9B:
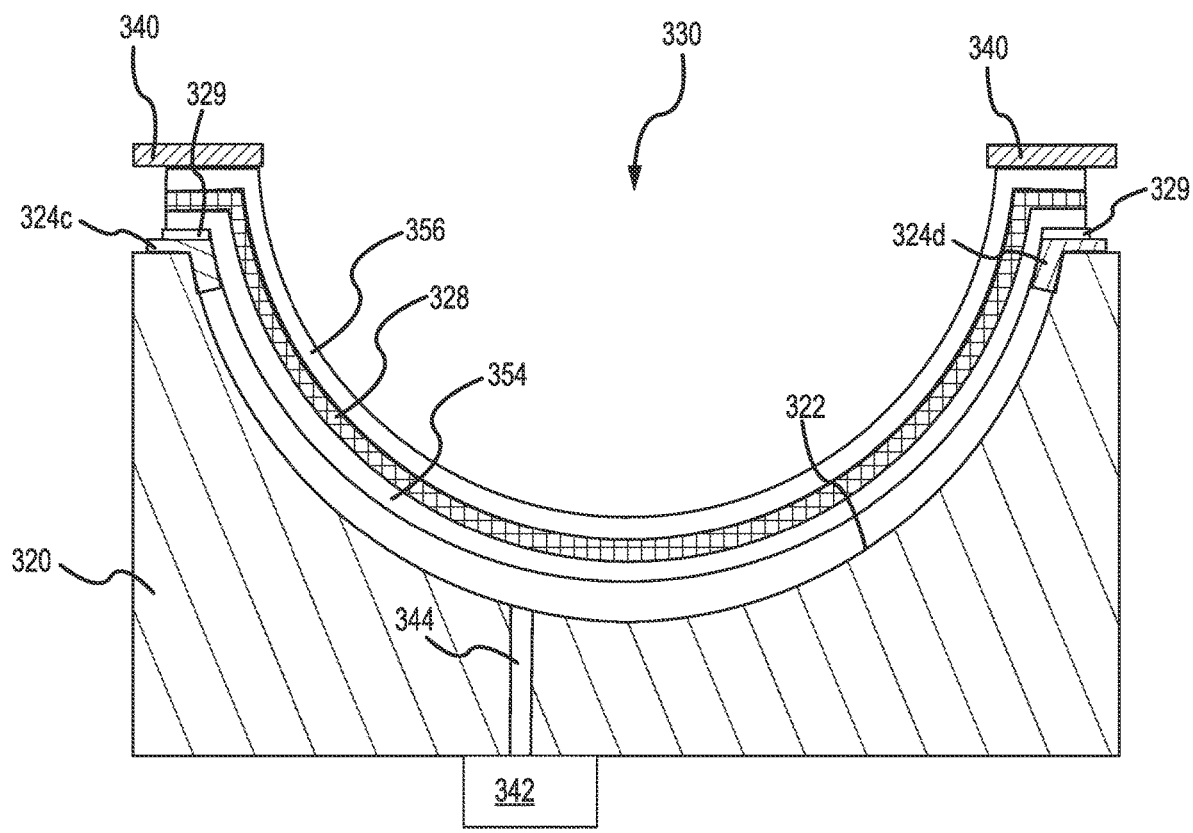
Figure 9C:
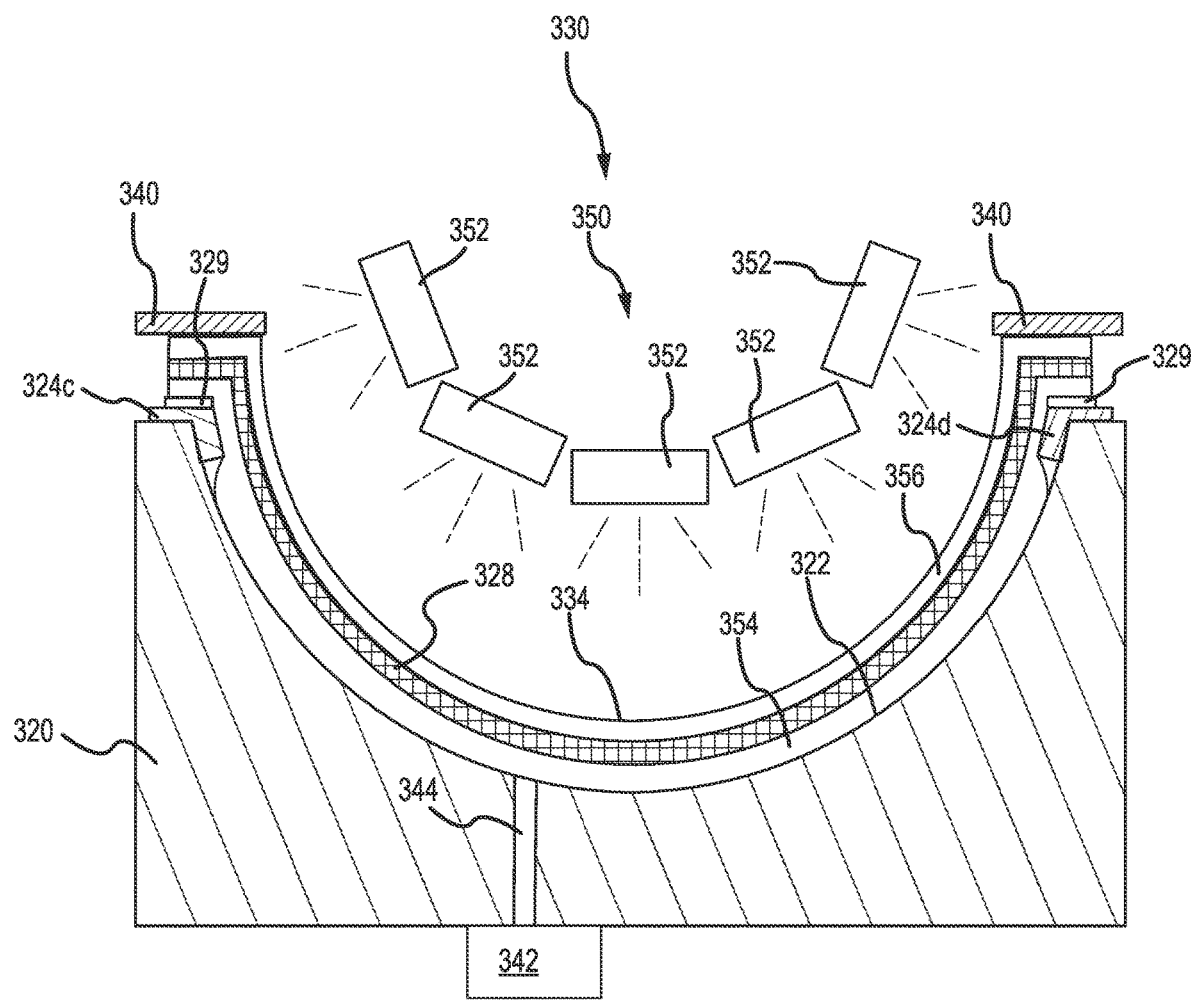

With reference to FIGS. 9A, 9B and 9C, in various embodiments, AFP assembly 330 may include a top frame 340. In various embodiments, top frame 340 may be utilized with lightning strike protection layer 328 located on mold surface 322, as shown in FIGS. 8A-8F. In various embodiments, top frame 340 may be utilized with lightning strike protection layer 328 located between a first thermoplastic layer 354 and a second thermoplastic layer 356, as shown in FIGS. 9A, 9B and 9C. Top frame 340 may be located over and/or on the thermoplastic material (e.g., first and second thermoplastic layers 354, 356) and attachment frames 324a, 324b, 324c, 324d to secure first and second thermoplastic layers 354, 356 relative to the mold tool 320. As such, the top frame 340 is a representative example of the above-noted sealing member 240 (FIGS. 7A-7D). Top frame 340 may generally follow the collective shape of attachment frames 324a, 324b, 324c, 324d. In this regard, top frame 340 may be located around and/or may generally surround the perimeter of mold surface 322. Top frame 340 may define an opening 346. The shape of opening 346 (i.e., the portions of top frame 340 that define opening 346) may generally follow the contour of the mold surface 322. Top frame 340 may force first and second thermoplastic layers 354, 356 toward attachment frames 324a, 324b, 324c, 324d and/or otherwise cause an airtight seal to be formed between first and second thermoplastic layers 354, 356 and attachment frames 324a, 324b, 324c, 324d. In various embodiments, tape 329 may located between first thermoplastic layer 354 and attachment frames 324a, 324b, 324c, 324d to enhance the hermetic seal between first and second thermoplastic layers 354, 356 and attachment frames 324a, 324b, 324c, 324d.

In accordance with various embodiments, heater units 352 (e.g., infrared heat lamps) of heating element 350 are collectively positioned to at least generally follow the contour of the mold surface 322 and/or the contour of first and second thermoplastic layers 354, 356. In accordance with various embodiments, first thermoplastic layer 354, lightning strike protection layer 328, and second thermoplastic layer 356 are spaced apart from mold surface 322 prior to heating. The various heater units 352 may be at least substantially equally-spaced from first and second thermoplastic layers 354, 356. For example, heater units 352 may be at least substantially equally-spaced from an exterior surface 334 of second thermoplastic layer 356. Exterior surface 334 is oriented away from first thermoplastic layer 354 and mold surface 322. In various embodiments, exterior surface 334 may have a generally concave shape prior to heating. One or more of the heater units 352 may be disposed in a different orientation, including where each heater unit 352 is disposed in a different orientation.

Heater units 352 are configured to first and second thermoplastic layers 354, 356 to a sufficient pliable forming temperature, wherein the first and second thermoplastic layers 354, 356 become pliable for forming purposes. In various embodiments, the pliable forming temperature for first and second thermoplastic layers 354, 356 is greater than or equal to a glass transition temperature of first and second thermoplastic layers 354, 356 and less than a melting point of the first and second thermoplastic layers 354, 356. As will be appreciated by those skilled in the art, the suitable pliable forming temperature may vary depending on the particular type of thermoplastic material being used, as well as other factors, such as the thickness of first and second thermoplastic layers 354, 356. As used herein, the term "pliable forming temperature" may refer to a range of temperatures, wherein first and second thermoplastic layers 354, 356 is suitable for forming (usually at or above the glass transition temperature).

The pressure created by vacuum 342 forces first and second thermoplastic layers 354, 356, which are at a pliable forming temperature, toward mold surface 322. Lightning strike protection layer 328, which is sandwiched between first thermoplastic layer 354 and second thermoplastic layer 356, is also forced toward mold surface 322 by first and second thermoplastic layers 354, 356. The vacuum forces first thermoplastic layer 354 into contact with mold surface 322 and causes first and second thermoplastic layers 354, 356 and lightning strike protection layer 328 to conform to mold surface 222.

In accordance with various embodiments, once first and second thermoplastic layers 354, 356 have conformed to mold surface 322, an AFP process, as described above with reference to FIGS. 4A, 4B, 4C, and 4D, may be performed over first and second thermoplastic layers 354, 356. In various embodiments, vacuum 342 may be turned off during the AFP process. In various embodiments, thermoplastic layer 332 may remain under vacuum pressure (e.g., via vacuum 342), during the AFP process.

AFP assembly 330, in combination with the dispensing assembly 160 and in accordance with FIGS. 4A-4D, may be employed to manufacture part 180 (FIG. 5) more quickly as compared to conventional AFP systems wherein multiple polyimide tape strips are applied to the mold surface. Conforming the thermoplastic material to the mold surface while heating the material, in conjunction with applying a vacuum pressure, may allow for more complex mold surface geometries, while minimizing, or eliminating, wrinkling. Locating thermoplastic layer 332 on lightning strike protection layer 328 and/or locating lightning strike protection layer 328 between first thermoplastic layer 354 and second thermoplastic layer 356 tends to reduce, or prevent, movement of lightning strike protection layer 328 during the AFP process.

Figure 10A:
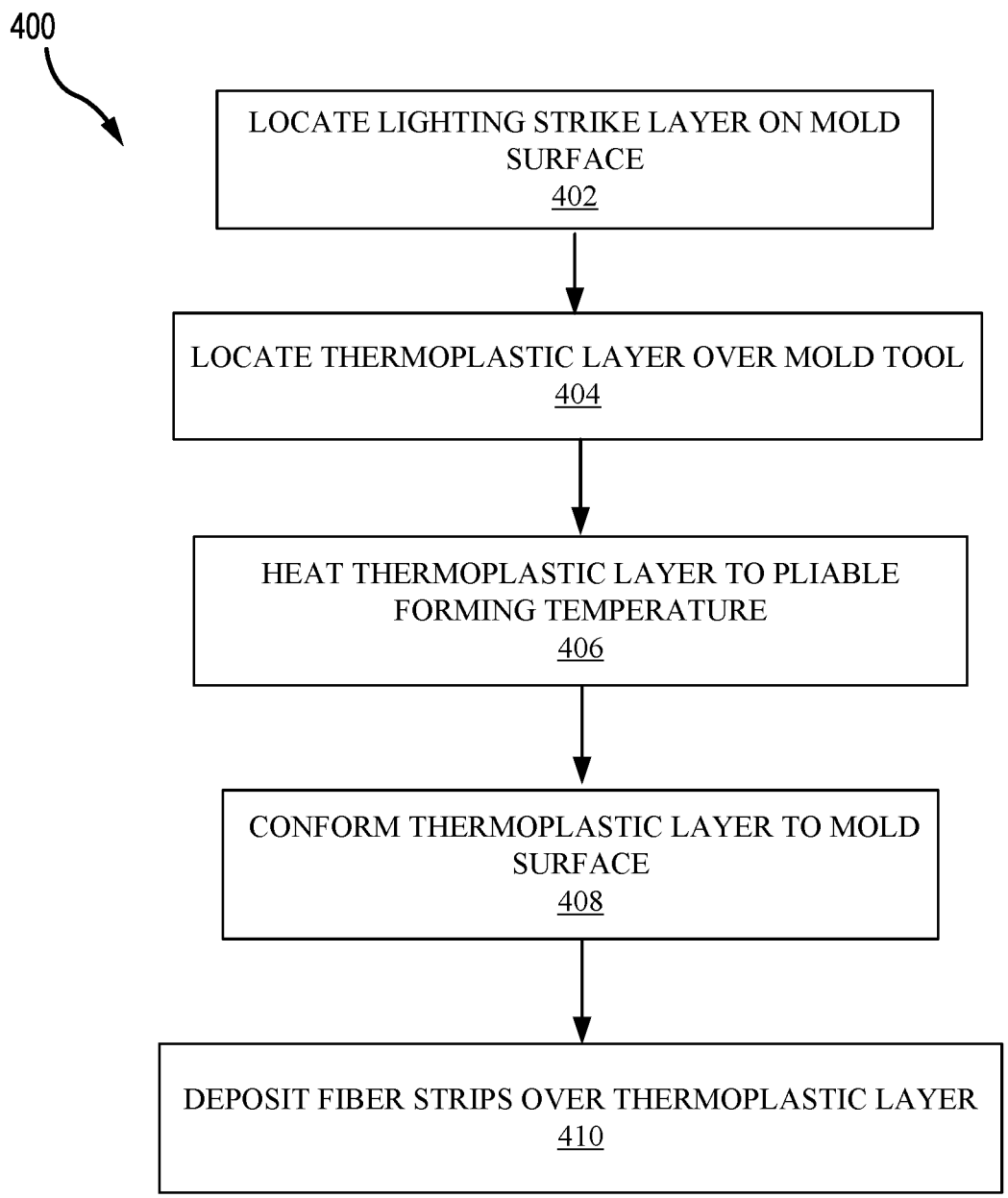
FIGS. 10A and 10B illustrate flow charts for a method for forming a fiber-reinforced thermoplastic component, in accordance with various embodiments.

With reference to FIG. 10A, a method 400 for forming a fiber-reinforced thermoplastic part is illustrated. In accordance with various embodiments, method 400 may include locating a lightning strike protection layer on a mold surface of (step 402), locating a thermoplastic layer over the mold tool (step 404), heating the thermoplastic layer to a pliable forming temperature (step 406), conforming the thermoplastic layer to the mold surface (step 408), and depositing a plurality of fiber strips over the thermoplastic layer (step 410).

In various embodiments, step 404 may include disposing an exterior surface of the thermoplastic layer in a concave configuration and facing a plurality of heater units and step 306 may include disposing each heater unit in at least substantially equally-spaced relation to the exterior surface of the thermoplastic layer.

Figure 10B:
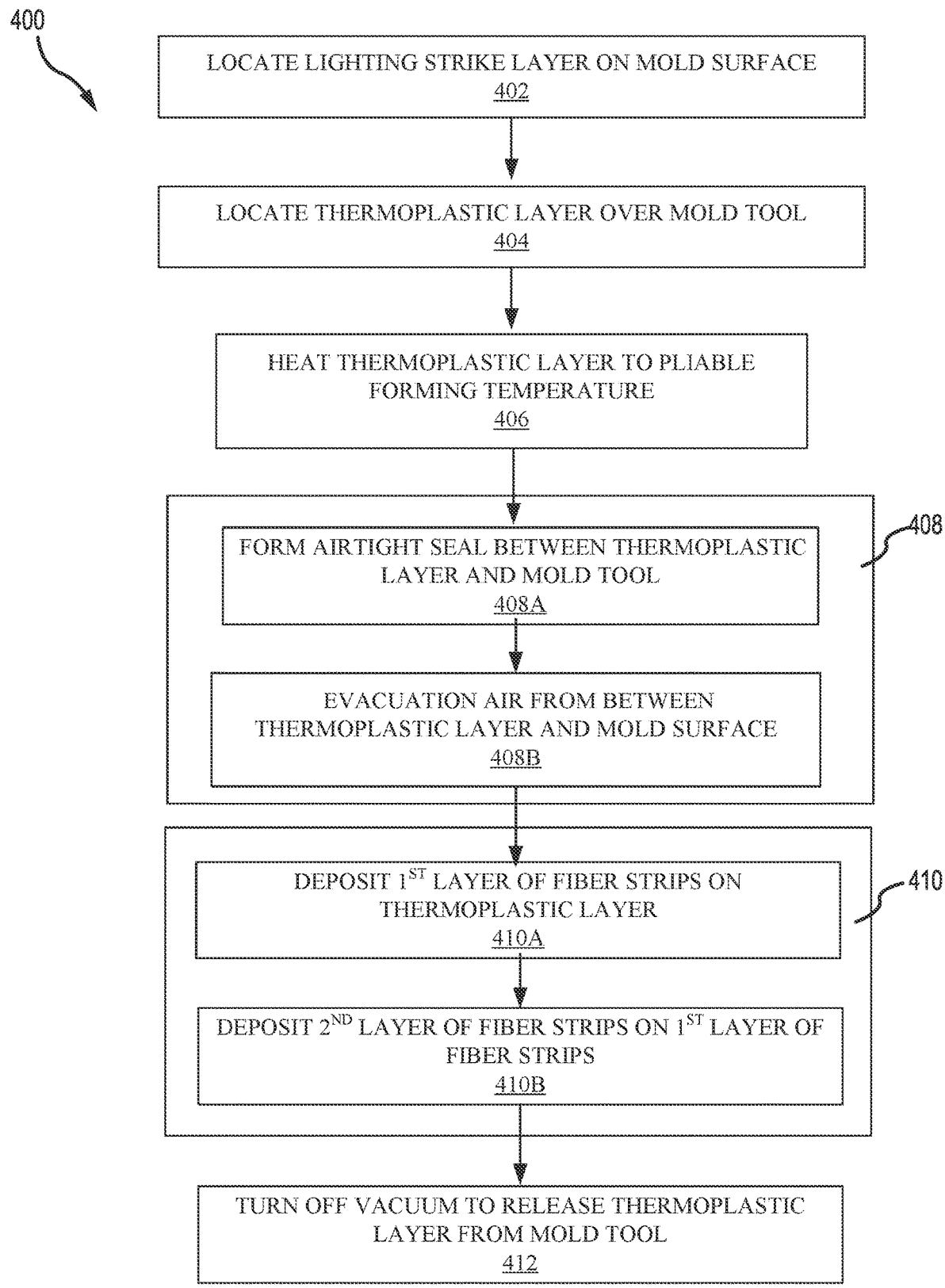

With reference to FIG. 10B, in various embodiments, step 408 may include forming an airtight seal between the thermoplastic layer and the mold tool (step 408A) and evacuating air from between the thermoplastic layer and the mold surface of the mold tool (step 408B). In various embodiments, step 408A may include forming an airtight seal between the thermoplastic layer and a plurality of attachment frames located around a perimeter of the mold surface. In various embodiments, forming the airtight seal between the thermoplastic layer and the plurality of attachment frames may include attaching a tape to the thermoplastic layer and to the attachment frames. In various embodiments, forming the airtight seal between the thermoplastic layer and the plurality of attachment frames may include locating a top frame on an exterior surface of the thermoplastic layer. In various embodiments, step 406B may include powering on a vacuum fluidly coupled to a channel defined by the mold tool.

In various embodiments, step 410 may include depositing a first layer of fiber strips on the thermoplastic layer (step 410A) and depositing a second layer of fiber strips on the first layer of fiber strips (step 410B). In various embodiments, method 400 may comprise applying heat and pressure to the first layer of fiber strips prior to depositing the second layer of fiber strips. (i.e., prior to step 410B). In various embodiments, method 400 may further comprising releasing the thermoplastic layer from the mold tool by turning off the vacuum (step 412).

Figure 11A:
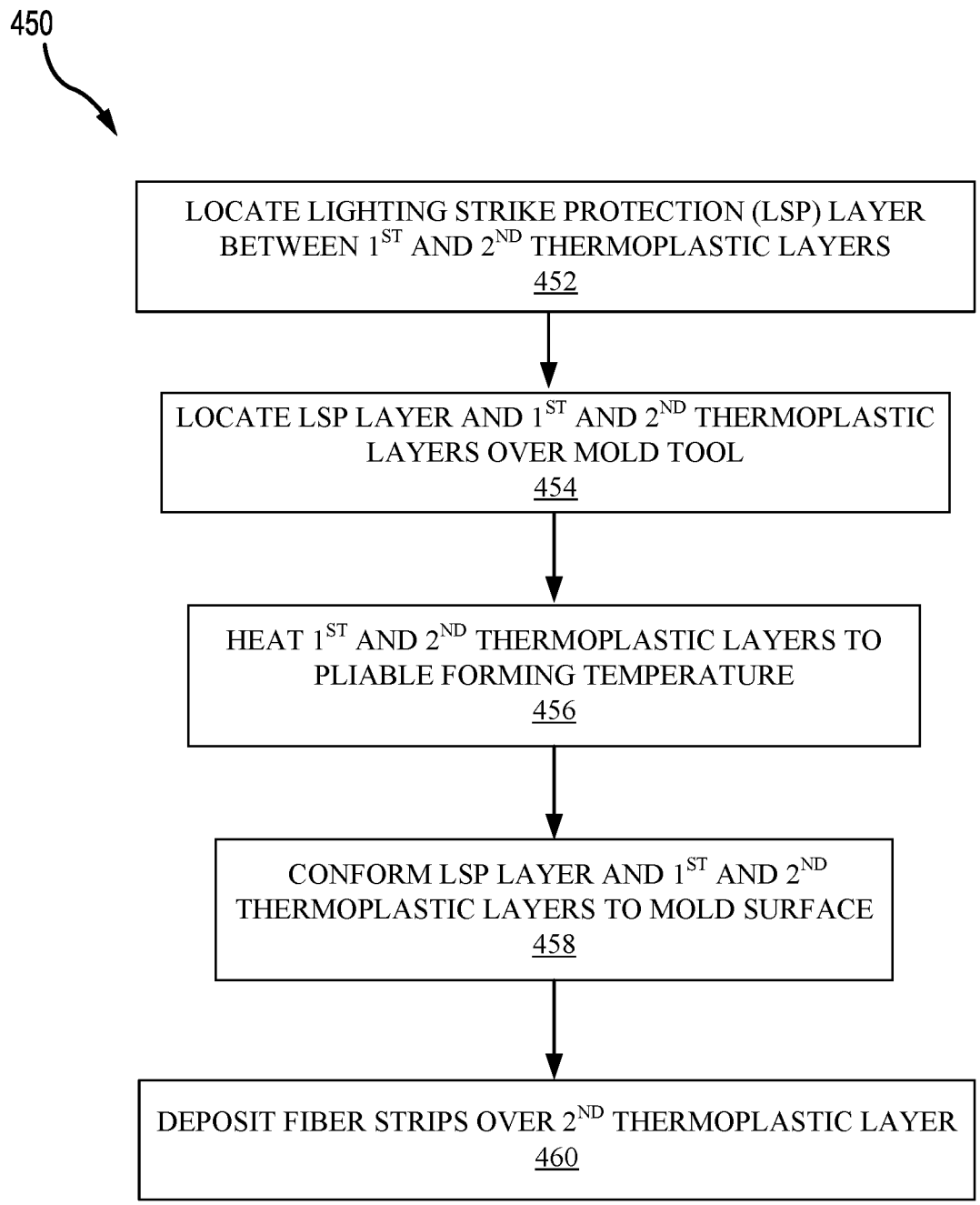
FIGS. 11A, 11B, 11C, and 11D illustrate flow charts for a method for forming a fiber-reinforced thermoplastic component, in accordance with various embodiments.

With reference to FIG. 11A, a method 450 of for forming a fiber-reinforced thermoplastic part is illustrated. In accordance with various embodiments, method 450 includes locating a lightning strike protection layer between a first thermoplastic layer and a second thermoplastic layer (step 452) and coupling the lightning strike protection layer, the first thermoplastic layer, and the second thermoplastic layer to a mold tool with the lightning strike protection layer, the first thermoplastic layer, and the second thermoplastic layer spaced apart from a mold surface of the mold tool (step 454). Method 450 further includes heating the first thermoplastic layer and the second thermoplastic layer to a pliable forming temperature (step 456), conforming the first thermoplastic layer, the lightning strike protection layer, and the second thermoplastic layer to the mold surface (step 458), and depositing a plurality of fiber strips over the second thermoplastic layer (step 460).

Figure 11B:
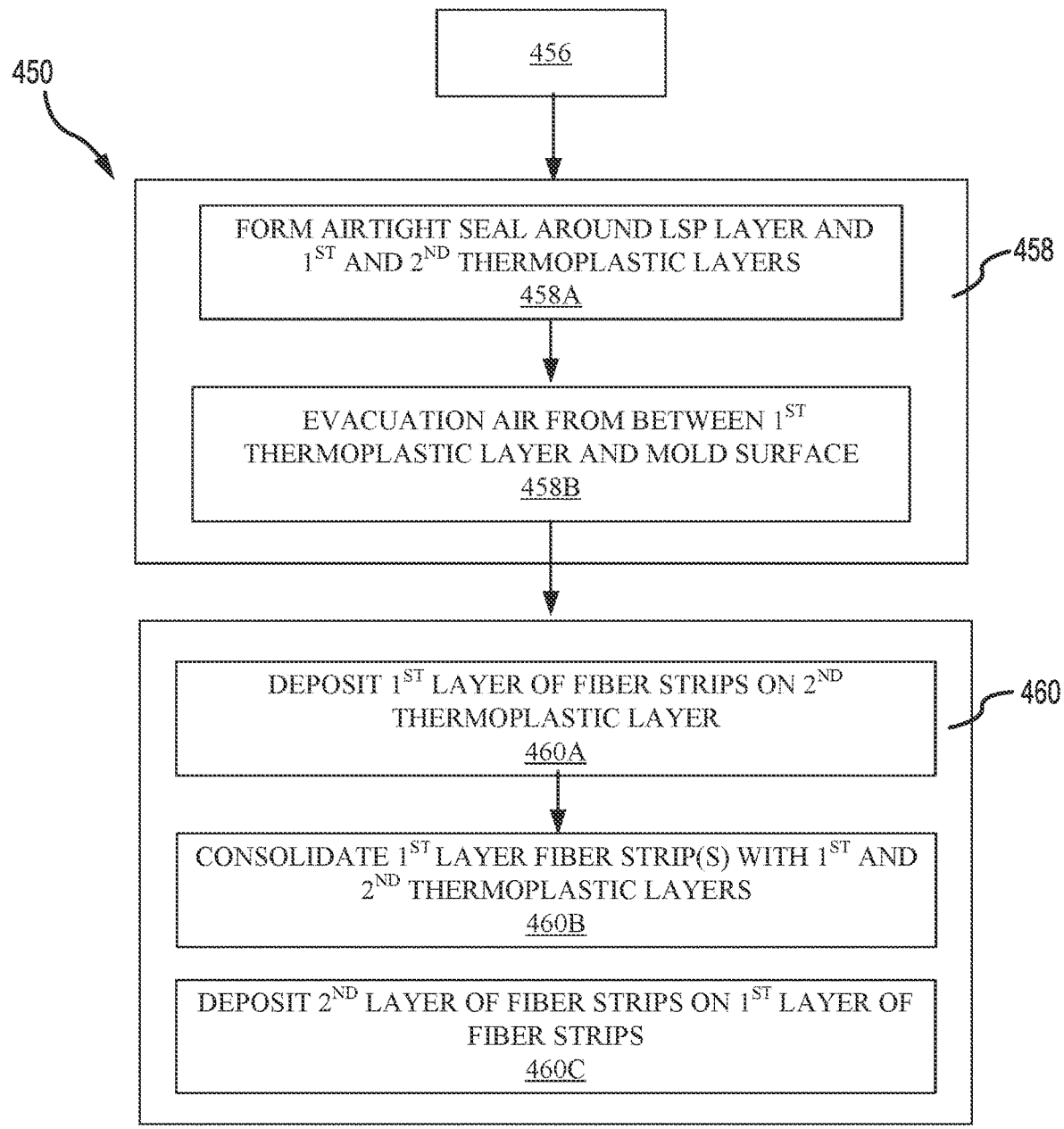

With reference to FIG. 11B, in various embodiments, step 458 may include forming an airtight seal around a perimeter of the first thermoplastic layer, the lightning strike protection layer, and the second thermoplastic layer (step 458A) and evacuating air from between the first thermoplastic layer and the mold surface of the mold tool (step 458B). In various embodiments, step 458A may include attaching a tape to the first thermoplastic layer and a plurality of attachment frames located around the perimeter of the mold surface. In various embodiments, step 458A may include locating a top frame on an exterior surface of the second thermoplastic layer.

In various embodiments, step 460 may include depositing a first layer of fiber strips on the second thermoplastic layer (step 460A), consolidating a first fiber strip of the first layer of fiber strips with the second thermoplastic layer and the first thermoplastic layer by heating the first fiber strip, the first thermoplastic layer, and the second thermoplastic layer to a temperature sufficient to melt the first thermoplastic layer, the second thermoplastic layer, and a matrix material of the first fiber strip (step 460B), and depositing a second layer of fiber strips on the first layer of fiber strips (step 460C). In various embodiments, step 460B may include crosslinking the first thermoplastic layer with the second thermoplastic layer through openings in the metallic mesh.

Figure 11C:
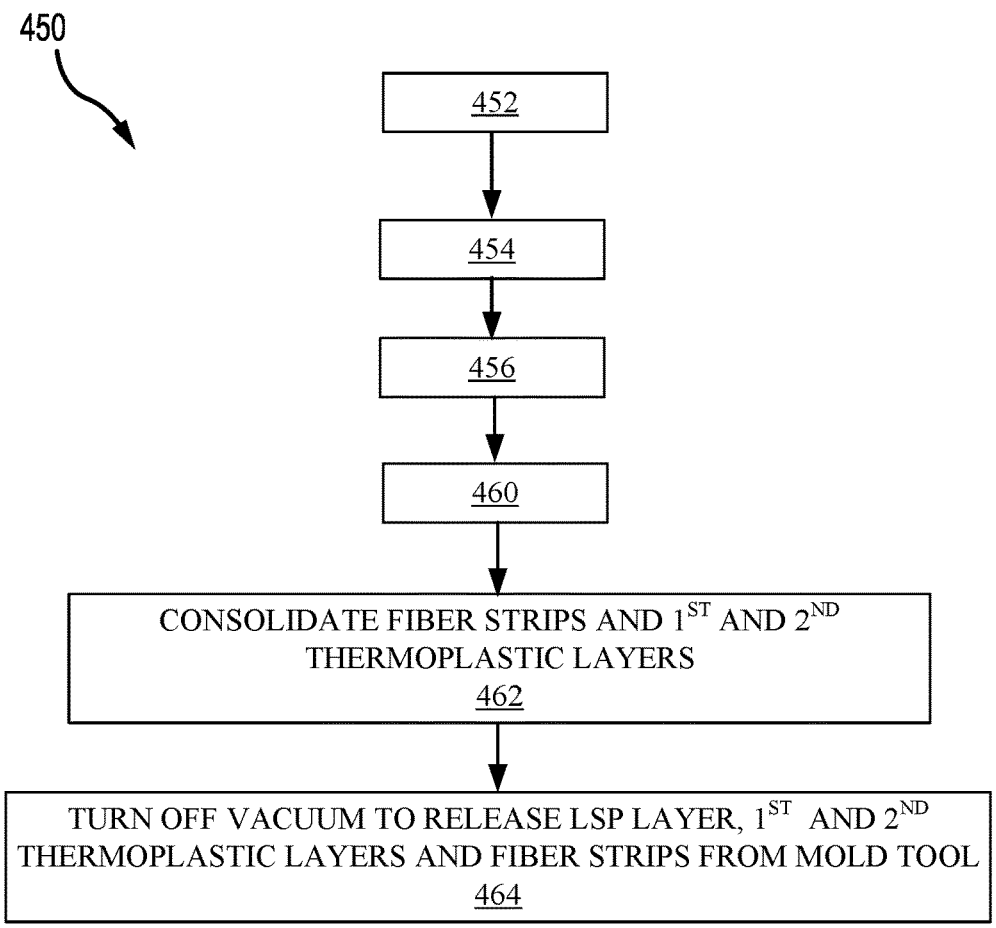

With reference to FIG. 11C, in various embodiments, method 450 may further comprising consolidating the plurality of fiber strips, the second thermoplastic layer, and the first thermoplastic layer (step 462). In various embodiments, method 450 may further comprising releasing the first thermoplastic layer, the lightning strike protection layer, the second thermoplastic layer, and the plurality of fiber strips from the mold tool by turning off a vacuum fluidly coupled to a channel extending to the mold surface (step 464)

Figure 11D:
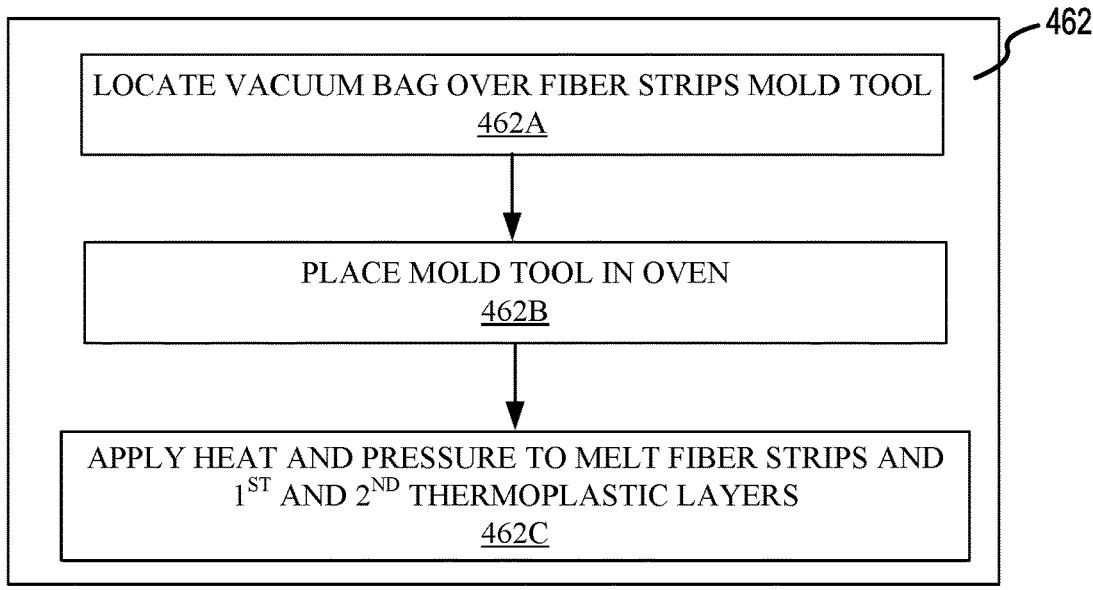

With reference to FIG. 11D, in various embodiments, step 462 may include locating a vacuum bag over the plurality of fiber strips and the mold tool (step 462A), placing the mold tool in an oven (step 462B), and applying heat and pressure (e.g., vacuum) to the plurality of fiber strips, the second thermoplastic layer, and the first thermoplastic layer, the heat and pressure being sufficient to melt the second thermoplastic layer, the first thermoplastic layer, and a matrix of the plurality of fiber strips (step 462C). In various embodiments, step 462c may include crosslinking the first thermoplastic layer with the second thermoplastic layer through openings in the metallic mesh.

Methods 400, 450 and AFP assemblies 130, 230, 330 tend to allow fiber-reinforced thermoplastic part 180 (FIG. 5) to be manufactured more quickly as compared to conventional AFP systems wherein multiple polyimide tape strips are applied to the mold surface prior to depositing the fiber strips. Conforming the thermoplastic layer(s) 132, 234, 236, 354, 356 and the lightning strike protection layer 128, 228, 328 to the mold surface 122, 222, 322 by applying vacuum pressure to the heated/pliable thermoplastic layer(s) 132, 234, 236, 354, 356 may allow for more complex mold surface geometries, while minimizing, or eliminating, wrinkling and/or movement of the lightning strike protection layer 128, 228, 328 during the AFP process.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming a fiber-reinforced thermoplastic part, the method comprising:
    locating a lightning strike protection layer on a mold surface of a mold tool;
    locating a sealing member around a perimeter of a thermoplastic material;
    locating the thermoplastic layer over the mold tool including over the lightning strike protection layer, wherein the mold tool comprises a mold surface and wherein the mold surface comprises at least one planar surface and at least one curved surface;
    prior to heating, forming an airtight seal between the thermoplastic layer and the mold tool via the sealing member, the sealing member configured to couple the thermoplastic layer to the perimeter of the at least one planar surface and the at least one curved surface of the mold tool such that the thermoplastic layer is spaced apart from the mold surface of the mold tool;
    heating the thermoplastic layer, while coupled to the mold tool via the sealing member, to a pliable forming temperature;
    conforming the thermoplastic layer to the lightning strike protection layer on the mold surface of the mold tool; and
    depositing a plurality of fiber strips over the thermoplastic layer.

2. The method of claim 1, wherein conforming the thermoplastic layer to the mold surface of the mold tool comprises:

evacuating air from between the thermoplastic layer and the mold surface of the mold tool.

3. The method of claim 2, wherein the lightning strike protection layer is a metallic mesh.

4. The method claim 3, wherein heating the thermoplastic layer to the pliable forming temperature comprises heating the thermoplastic layer with the thermoplastic layer spaced apart from the mold surface and the lightning strike protection layer.

5. The method of claim 4, wherein depositing the plurality of fiber strips over the thermoplastic layer includes:
depositing a first layer of fiber strips on the thermoplastic layer; and
depositing a second layer of fiber strips on the first layer of fiber strips.

6. The method of claim 5, wherein the pliable forming temperature is greater than or equal to a glass transition temperature of the thermoplastic layer and less than a melting point of the thermoplastic layer.

7. The method of claim 2, wherein locating the thermoplastic layer over the mold tool comprises disposing an exterior surface of the thermoplastic layer in a concave configuration, the exterior surface facing a plurality of heater units, and wherein heating the thermoplastic layer to the pliable forming temperature comprises disposing each heater unit of the plurality of heater units in at least substantially equally-spaced relation to the exterior surface.

8. The method of claim 3, wherein evacuating air from between the thermoplastic layer and the mold surface of the mold tool comprises powering on a vacuum fluidly coupled to a channel defined by the mold tool.

9. The method of claim 8, further comprising releasing the thermoplastic layer from the mold tool by turning off the vacuum.

10. A method for forming a fiber-reinforced thermoplastic part, the method comprising:
locating a lightning strike protection layer between a first thermoplastic layer and a second thermoplastic layer;
coupling the lightning strike protection layer, the first thermoplastic layer, and the second thermoplastic layer to a mold tool with the lightning strike protection layer, the first thermoplastic layer, and the second thermoplastic layer spaced apart from a mold surface of the mold tool, wherein the mold surface comprises at least one planar surface and at least one curved surface;
prior to heating, forming an airtight seal around a perimeter of the lightning strike protection layer, the first thermoplastic layer, and the second thermoplastic layer, and the mold surface of the mold tool including the at least one planar surface and the at least one curved surface, wherein forming the airtight seal around the perimeter of the lightning strike protection layer, the first thermoplastic layer, and the second thermoplastic layer, and the mold surface of the mold tool includes the use of a sealing member between the lightning strike protection layer, the first thermoplastic layer, and the second thermoplastic layer, and the at least one planar surface and the at least one curved surface of the mold tool, the sealing member configured to couple the lightning strike protection layer, the first thermoplastic layer, and the second thermoplastic layer to the at least one planar surface and the at least one curved surface of the mold tool;
heating the first thermoplastic layer and the second thermoplastic layer, while coupled to the mold tool via the sealing member, to a pliable forming temperature;
conforming the first thermoplastic layer, the lightning strike protection layer, and the second thermoplastic layer to the mold surface; and
depositing a plurality of fiber strips over the second thermoplastic layer.

11. The method of claim 10, wherein conforming the first thermoplastic layer, the lightning strike protection layer, and the second thermoplastic layer to the mold surface comprises:
evacuating air from between the first thermoplastic layer and the mold surface of the mold tool.

12. The method of claim 11, forming the airtight seal around the perimeter of the first thermoplastic layer and the mold surface of the mold tool comprises attaching a tape to the first thermoplastic layer and to a plurality of attachment frames located around a perimeter of the mold surface.

13. The method of claim 11 wherein forming the airtight seal around the perimeter of the first thermoplastic layer and the mold surface of the mold tool comprises locating a top frame on an exterior surface of the first thermoplastic layer.

14. The method of claim 13, wherein depositing the plurality of fiber strips over the second thermoplastic layer comprises:
depositing a first layer of fiber strips on the second thermoplastic layer;
consolidating a first fiber strip of the first layer of fiber strips with the second thermoplastic layer and the first thermoplastic layer by heating the first fiber strip, the first thermoplastic layer, and the second thermoplastic layer to a temperature sufficient to melt the first thermoplastic layer, the second thermoplastic layer, and a matrix material of the first fiber strip; and
depositing a second layer of fiber strips on the first layer of fiber strips, wherein consolidating the first fiber strip with the second thermoplastic layer and the first thermoplastic layer comprises crosslinking the first thermoplastic layer with the second thermoplastic layer through openings in the lightning strike protection layer.

15. The method of claim 10, further comprising consolidating the plurality of fiber strips, the second thermoplastic layer, and the first thermoplastic layer by:
locating a vacuum bag over the plurality of fiber strips and the mold tool;
placing the mold tool in an oven; and
applying heat and pressure to the plurality of fiber strips, the second thermoplastic layer, and the first thermoplastic layer, the heat and pressure being sufficient to melt the second thermoplastic layer, the first thermoplastic layer, and a matrix of the plurality of fiber strips.

16. The method of claim 10, further comprising releasing the first thermoplastic layer, the lightning strike protection layer, the second thermoplastic layer, and the plurality of fiber strips from the mold tool by turning off a vacuum fluidly coupled to a channel extending to the mold surface.

* * * * *